(12) United States Patent
Suzuki

(10) Patent No.: US 7,599,257 B2
(45) Date of Patent: Oct. 6, 2009

(54) DISK DRIVE APPARATUS AND SEEK METHOD

(75) Inventor: Yuichi Suzuki, Kanagawa (JP)

(73) Assignee: Sony Corporation, Tokyo (JP)

(*) Notice: Subject to any disclaimer, the term of this patent is extended or adjusted under 35 U.S.C. 154(b) by 754 days.

(21) Appl. No.: 11/220,681

(22) Filed: Sep. 8, 2005

(65) Prior Publication Data
US 2006/0077805 A1 Apr. 13, 2006

(30) Foreign Application Priority Data
Sep. 14, 2004 (JP) ............... 2004-266733

(51) Int. Cl.
*G11B 7/00* (2006.01)
(52) U.S. Cl. ............... 369/44.26; 369/53.29; 369/53.39
(58) Field of Classification Search ............... None
See application file for complete search history.

(56) References Cited
U.S. PATENT DOCUMENTS
6,519,213 B1* 2/2003 Song et al. ............... 369/44.26

FOREIGN PATENT DOCUMENTS
JP 64-67776 3/1989
JP 2002-279624 9/2002
JP 2003-67937 3/2003

* cited by examiner

*Primary Examiner*—Wayne R Young
*Assistant Examiner*—Adam R Giesy
(74) *Attorney, Agent, or Firm*—Oblon, Spivak, McClelland, Maier & Neustadt, L.L.P.

(57) ABSTRACT

The determination on the reach to a BCA by using a pull-in signal in a seek for the BCA may eliminate the necessity of a position sensor for determination of the reach to a BCA, for example, which can realize a seek independent of a count of the number of steps by a stepping motor, for example. Thus, the construction can be simplified, and the costs can be reduced. Furthermore, the required accuracy of disk chucking and mechanical accuracy of the mechanisms may be alleviated, which can provide simplicity in design and manufacture. The pickup unit can be allowed to perform the secure reading of information in a BCA by, after the transporting unit is stopped based on the determination on the reach to the BCA, monitoring the determination results (determination signals) based on a pull-in signal, for example, with the objective lens at different positions and controlling the position of the objective lens to an optimum position.

17 Claims, 12 Drawing Sheets

DISK DRIVE APPARATUS

FIG. 5A
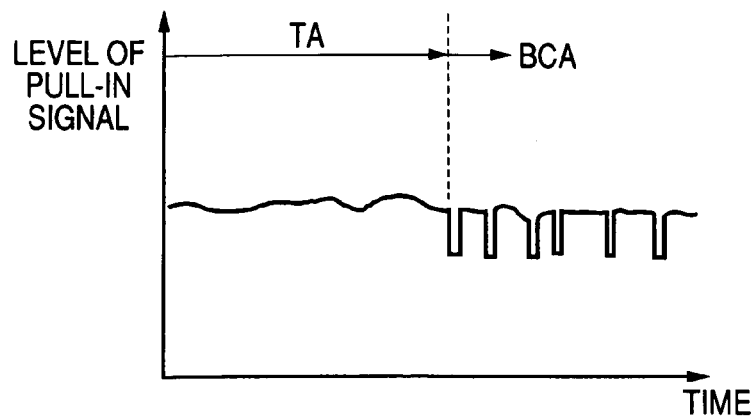
FIG. 5B
FIG. 5C
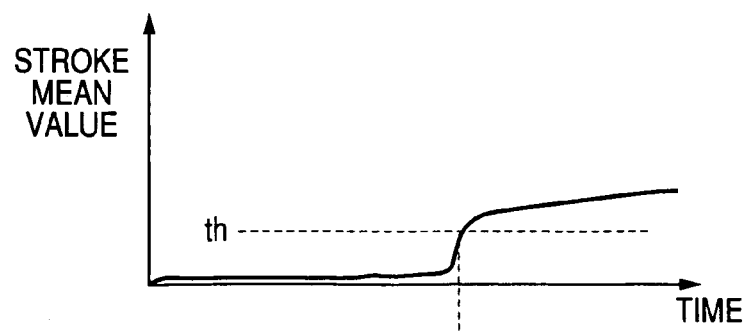
FIG. 5D dBCA

FIG. 8

| RESULT PATTERNS | INNER CIRCUMFERENCE (Rg0) | INNER CIRCUMFERENCE (Rg1) | INNER CIRCUMFERENCE (Rg2) | DETERMINED POSITIONS |
|---|---|---|---|---|
| P1 | Y | Y | Y | CENTER OF FIELD OF VISION |
| P2 | Y | Y | N | INNER CIRCUMFERENCE |
| P3 | Y | N | N | INNER CIRCUMFERENCE |
| P4 | N | Y | Y | OUTER CIRCUMFERENCE |
| P5 | N | N | Y | OUTER CIRCUMFERENCE |
| P6 | N | Y | N | CENTER OF FIELD OF VISION |
| P7 | N | N | N | ERROR |

Y: BCA REACH DETERMINED
N: BCA REACH NOT DETERMINED

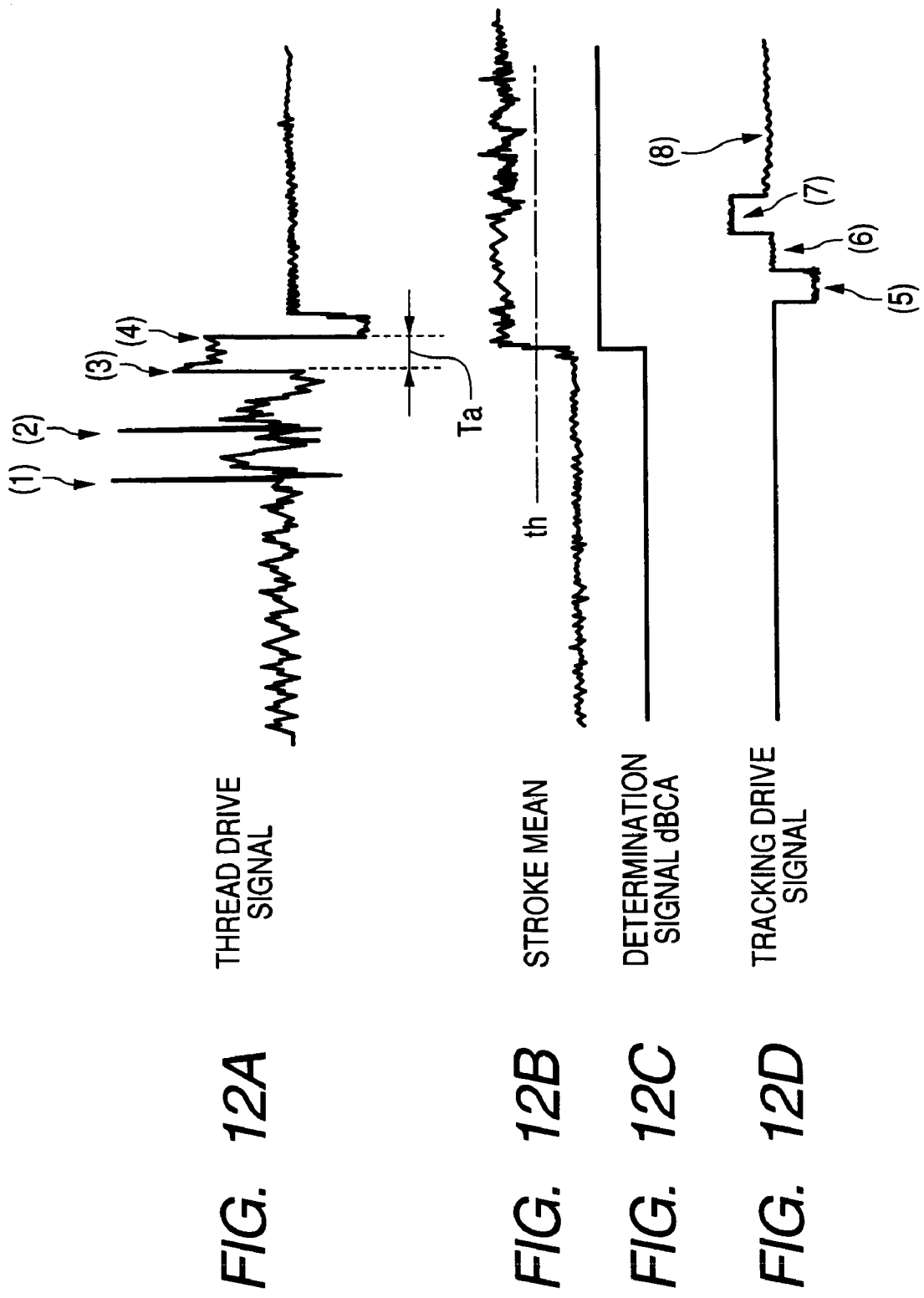
FIG. 12A  THREAD DRIVE SIGNAL
FIG. 12B  STROKE MEAN
FIG. 12C  DETERMINATION SIGNAL dBCA
FIG. 12D  TRACKING DRIVE SIGNAL

DISK DRIVE APPARATUS AND SEEK METHOD

CROSS REFERENCES TO RELATED APPLICATIONS

The present invention contains subject matter related to Japanese Patent Application JP2004-266733 filed in the Japanese Patent Office on Sep. 14, 2004, the entire contents of which being incorporated herein by reference.

BACKGROUND OF THE INVENTION

1. Field of the Invention

The present invention relates to a disk drive apparatus for a disk having a Burst Cutting Area (BCA) and a seek method for a BCA in a disk drive apparatus.

2. Description of Related Art

Technologies for writing/reading digital data may include a data recording technology using an optical disk (including a magneto-optical disk) as a recording medium, such as a Compact Disk (CD), a Mini-Disk (MD) and a Digital Versatile Disk (DVD).

Optical disks may be divided into those of a read-only type as known as a CD, a CD-ROM and a DVD-ROM and those of a type on which user data is writable as known as an MD, an MO, a CD-R, a CD-RW, a DVD-R, DVD-RW, a DVD+RW and a DVD-RAM. In the writable type, data is writable by using magneto-optical recording, phase change recording or dye-film change recording. The dye-film change recording may also be called write-once recording and is preferable for a data storage application since data is writable only once and is not rewritable. On the other hand, in the magneto-optical recording and phase change recording, data is rewritable and may be used for various applications such as recording contents data of music, moving images, games, application programs and so on.

Furthermore, in recent years, a high-density optical disk called Blue-Ray Disc has been developed, which has a significantly larger capacity.

Some of these types of optical disk may have a Burst Cutting Area (BCA) at a predetermined position on the disk, for example, in the innermost circumference.

Information such as a disk ID is recorded in the BCA by a recording method in which the recording layer is burnt out. The BCA is an area having barcode-like recorded data with a radial array of recorded marks, whereby a disk drive apparatus can read information in the BCA at a non-tracking state.

A technology for reading data from the BCA and seeking the BCA is disclosed in:

JP-A-10-228713 (Patent Document 1)

SUMMARY OF THE INVENTION

In a disk drive apparatus (disk writer/reader) in the past, whether a pickup thereof has reached the BCA or not is determined by using a position sensor of a thread mechanism (slider mechanism) for transporting the pickup in the direction of the radius of a disk in case of moving the pickup to the BCA in order to read information from the BCA of an installed disk.

Alternatively, the step accuracy may be used when the thread mechanism is stepping-motor-driven. In other words, the BCA seek is performed by, at the same time, counting the number of steps equivalent to the distance to the BCA.

Alternatively, when the thread mechanism includes a rack-and-pinion gear and a DC motor, a BCA seek is performed based on the number of counts by a rotation detecting encoder of the motor.

However, these methods may limit designs of a disk drive apparatus, which may increase the costs, since all of the methods depend on the mechanical accuracy such as the step accuracy of the sensor or motor or the accuracy of the position of chucking a disk. Furthermore, a BCA seek is not always able to be implemented accurately.

Furthermore, a disk drive apparatus compliant with disks in multiple formats (such as multiple kinds of disk having BCAs at different positions in the direction of the radiuses) may require multiple position sensors such that the reach to the BCA position can be determined for each kind of disk, which may bear loads in costs or construction.

For these reasons, the detectability of a BCA position with no sensor required during a seek and the realization of a proper seek for the BCA have been demanded.

Though Patent Document 1 discloses a technology for moving a pickup to a reference position of a disk once and then to a BCA data reading position, the technology does not solve the problem since, though not explicitly described therein, the seek for a BCA data reading position may be based on the number of steps by the stepping motor or the number of counts by the rotation detecting encoder.

Accordingly, it is desirable to propose a technology for allowing the detection of the reach to an area serving as a BCA during a seek for the BCA without depending on a sensor and/or the number of motor steps and also allowing the secure completion of the seek for the BCA.

According to an embodiment of the present invention, there is provided a disk drive apparatus writing or reading in accordance with a disk recording medium having a Burst Cutting Area at a predetermined position, the apparatus including pickup means irradiating laser light to the disk recording medium for writing or reading and detecting reflected light from the disk recording medium, transporting means transporting the pickup means in the direction of the radius of the disk recording medium, determining means inputting a pull-in signal as a sum signal low component of the reflected light detected by the pickup means and generating a determination signal indicating whether the position of the pickup means is in the Burst Cutting Area or not by using an absolute value of the difference in the direction of the time axis of the pull-in signal, and seek control means starting the transportation of the pickup means to the Burst Cutting Area by using the transporting means, monitoring the determination signal during the transportation, and finishing the transportation of the pickup means by the transporting means based on the determination signal.

The seek control means may, after finishing the transportation of the pickup means by the transporting means, shift the position of an objective lens serving as the laser output end of the pickup means to multiple positions and, at the same time, monitor the determination signals, and control the objective lens to an optimum position based on the determination signal at each of the objective lens positions.

The determining means may generate the determination signal by obtaining a stroke mean value with respect to the absolute value of the difference in the direction of the time axis of the pull-in signal and comparing the stroke mean value with a threshold value.

According to another embodiment of the invention, there is provided a disk drive apparatus writing or reading in accordance with a disk recording medium also having a Burst Cutting Area at a predetermined position, the apparatus including pickup means irradiating laser light to the disk recording medium for writing or reading and detecting reflected light from the disk recording medium, transporting means transporting the pickup means in the direction of the radius of the disk recording medium, determining means inputting a signal obtained from the reflected light detected by the pickup means and generating a determination signal indicating whether the pickup means is in the Burst Cutting Area or not by using the signal, and seek control means starting the transportation of the pickup means to the Burst Cutting Area by using the transporting means, monitoring the determination signal after a lapse of a predetermined time after the start of the transportation and finishing the transportation of the pickup means by the transporting means based on the determination signal.

The seek control means may perform the pre-transportation of the pickup means by the transporting means to a predetermined position on the disk recording medium and then start the transportation to the Burst Cutting Area.

The seek control means may, after finishing the transportation of the pickup means to the Burst Cutting Area by the transporting means, shift the position of an objective lens serving as the laser output end of the pickup means to multiple positions and, at the same time, monitor the determination signals, and control the objective lens to an optimum position based on the determination signal at each of the objective lens positions.

The determining means may generate the determination signal by inputting a pull-in signal as a sum signal low component of the reflected light detected by the pickup means and using the absolute value of the difference in the direction of the time axis of the pull-in signal. More specifically, the determining means may generate the determination signal by obtaining a stroke mean value with respect to the absolute value of the difference in the direction of the time axis of the pull-in signal and comparing the stroke mean value with a threshold value.

According to another embodiment of the invention, there is provided a seek method for a Burst Cutting Area in a disk drive apparatus writing or reading in accordance with a disk recording medium having the Burst Cutting Area at a predetermined position, the method including a transportation starting step of starting the transportation, to the Burst Cutting Area, of pickup means irradiating laser light to the disk recording medium for writing or reading and detecting reflected light from the disk recording medium, a determining step of determining whether the pickup means is in the Burst Cutting Area by using an absolute value of the difference in the direction of the time axis of the pull-in signal as a sum signal low component of the reflected light detected by the pickup means, and a transportation finishing step of finishing the transportation of the pickup means by the transporting means in accordance with the fact that the determining step detects that the pickup means has reached the Burst Cutting Area.

The seek method may further include a lens position control step of, after finishing the transportation of the pickup means by the transporting means in the transportation finishing step, shifting the position of an objective lens serving as the laser output end of the pickup means to multiple positions and, at the same time, monitoring the determination results of the determining step, and controlling the objective lens to an optimum position based on the determination result at each of the objective lens positions.

According to another embodiment of the invention, there is provided a seek method for a Burst Cutting Area in a disk drive apparatus writing or reading in accordance with a disk recording medium having the Burst Cutting Area at a predetermined position, the method including a transportation starting step of starting the transportation, to the Burst Cutting Area, of pickup means irradiating laser light to the disk recording medium for writing or reading and detecting reflected light from the disk recording medium, a determining step of determining whether the pickup means is in the Burst Cutting Area or not by using a signal obtained from the reflected light detected by the pickup means, a standby step of standing by until the detection of the determination result of the determining step for a predetermined period of time after the transportation starting step starts the transportation, and a transportation finishing step of finishing the transportation of the pickup means by the transporting means in accordance with the fact that the determining step detects that the pickup means has reached the Burst Cutting Area after a lapse of the predetermined period of time in the standby step.

In this case, the seek method may further include a pre-transportation step of transporting the pickup means to a predetermined position on the disk recording medium by the transporting means before the transportation starting step.

In other words, the embodiments of the present invention allow, in a BCA seek, the detection of the fact that a pickup unit has reached a BCA during the seek by using a pull-in signal obtained from reflected light detected by the pickup unit. The pull-in signal has a unique level change in accordance with the pattern of the BCA so that the reach to the BCA position can be detected by monitoring the level change during a BCA seek.

The embodiments of the invention can prevent the detection of the reach to a BCA for a predetermined period of time after the start of a seek for the BCA though the pickup unit detects the reach to the BCA by using a signal obtained from reflected light detected by the pickup unit in a BCA seek. The prevention of the detection of the reach to a BCA for a predetermined period of time does not finish the transportation for a seek until the predetermined period of time has passed though a seek is to be finished in a timing in accordance with BCA determination by using a pull-in signal, for example.

The embodiments of the invention can provide advantages below.

The determination on the reach to a BCA by using a pull-in signal in a seek for the BCA may eliminate the necessity of a position sensor for determination of the reach to a BCA, for example, which can realize a seek independent of a count of the number of steps by a stepping motor, for example. Thus, the construction can be simplified, and the costs can be reduced. Furthermore, the required accuracy of disk chucking and mechanical accuracy of the mechanisms may be alleviated, which can provide simplicity in design and manufacture.

The pickup unit can be allowed to perform the secure reading of information in a BCA by, after the transporting unit is stopped based on the determination on the reach to the BCA, monitoring the determination results (determination signals) based on a pull-in signal, for example, with the objective lens at different positions and controlling the position of the objective lens to an optimum position. Thus, the pickup unit is allowed to securely read information from the BCA, and the reliability of a BCA seek can be increased against a variation in the mechanical loads, an impact, a shake, a decentered disk.

Furthermore, since the determination on the reach to a BCA by using a pull-in signal, for example, can be implemented in a short period of time, the time required for the entire BCA reading can be more reduced than that in a system which actually tries BCA reading and, if error, retries the seek. This may directly contribute to the reduction of the start-up time of the disk drive apparatus.

Furthermore, the determination signal for the determination on the reach to a BCA may be generated easily and as a signal with few detection errors and, therefore, with high accuracy by obtaining a stroke mean value for the absolute value of a difference in the direction of the time axis of a pull-in signal and comparing the stroke mean value with a threshold value.

In the determination on the reach to a BCA to be performed by using a signal obtained from reflected light, such as a pull-in signal, in a seek for the BCA, the seek therefor is not finished until a predetermined period of time has passed by standing by without performing the detection of the determination on the reach to the BCA for the predetermined period of time after starting the transportation of the pickup unit to the BCA and, after the predetermined period of time, finishing the seek by the transporting unit based on the determination on the reach to the BCA. Thus, the occurrence of finishing the seek at an end of the area serving as the BCA can be prevented as much as possible. In other words, the seek can be finished near the substantial center within the BCA as much as possible. Therefore, the secure BCA read can be implemented even with a decentered disk and/or a shake, for example.

Furthermore, the operation, that is, the operation for seeking can be performed more accurately near the center of the BCA as much as possible by performing the pre-transportation for transporting the pickup unit to a predetermined position on a disk recording medium before the start of the transportation to the BCA. This is because the predetermined period of time can be defined accurately to some extent by fixing the starting position of the BCA seek.

Furthermore, the prevention of the implementation of the determination on the BCA reach for a predetermined period of time and/or the transportation to a predetermined position on a disk before a BCA read may prevent a detection error due to a state of recording user data, for example, in the determination of the reach to a BCA by using a pull-in signal, for example, which can increase the accuracy of the BCA seek.

BRIEF DESCRIPTION OF THE DRAWINGS

FIGS. 5A to 5D are explanatory diagrams of a determination signal generated from a pull-in signal of the embodiment;

FIG. 8 is an explanatory diagram for the determination of an optimum position of an objective lens during a BCA seek of the embodiment;

FIGS. 12A to 12D are explanatory diagrams of signal waveforms during the second BCA seek operation of the embodiment.

DESCRIPTION OF THE PREFERRED EMBODIMENTS

An embodiment of the invention will be described below in the order below:
1. Area Structure of Disk;
2. Construction of Disk Drive Apparatus;
3. Construction for BCA Seek;
4. First BCA Seek Operation Example; and
5. Second BCA Seek Operation Example 1. Area Structure of Disk First of all, an area structure of a disk 1 subject to writing or reading by a disk drive apparatus of an embodiment of the invention will be described with reference to FIG. 1.

Figure 1:
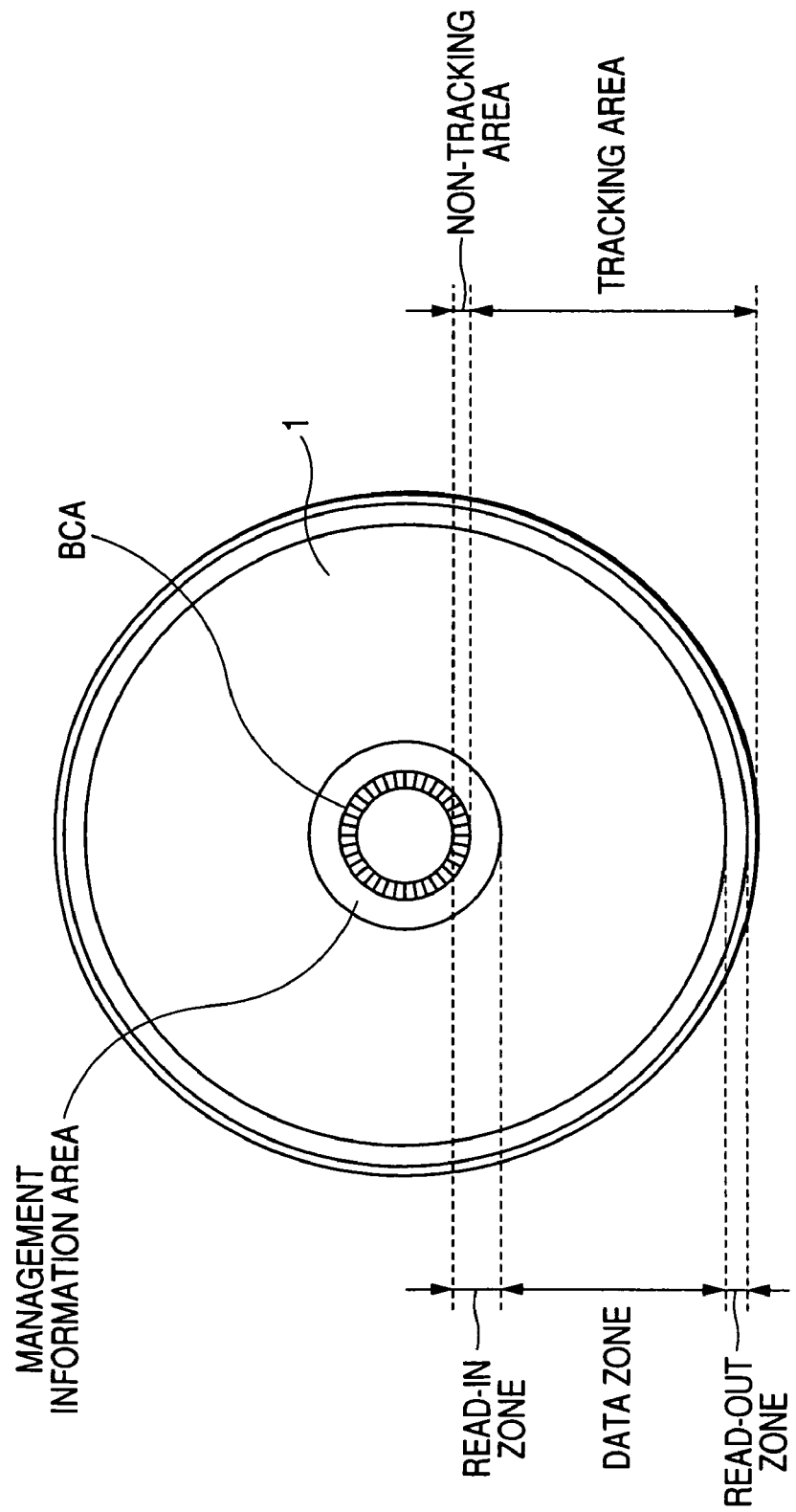
FIG. 1 is an explanatory diagram of an area structure of a disk.

FIG. 1 shows a layout (area structure) of the entire disk.

The disk has areas of a read-in zone, a data zone and read-out zone from the inner circumferential side.

The read-in zone has a Burst Cutting Area (BCA) on the inner most circumferential side. The BCA has management information such as an ID unique to a disk recording medium, which is recorded by a recording method of burning out the recording layer. In other words, the BCA has barcode-like recorded data with a radial array of recorded marks. Furthermore, the BCA serves as a non-tracking area and is subject to data reading without tracking-servoed, that is, at a non-tracking state.

The outer circumferential side with respect to the BCA serves as a tracking area, and the tracking area entirely has recording tracks with groove or pit tracks and is normally subject to data reading or writing with tracking-servoed.

A read-only disk has a series of spiral tracks with an embossed pit array to the outermost circumference in the tracking area.

A write/read disk (such as a write-once disk and a rewritable disk) has recording tracks with a series of wobbling spiral grooves in the tracking area, and data writing/reading is performed on the recording track with a dye change pit mark or a phase change pit mark. The wobbling groove allows the recording of physical address information (ADIP: Address in Pregroove) on the disk.

The inner most circumference of the tracking area, that is, the outer circumferential side of the BCA is handled as a management information area. The management information area may have an area for recording physical management information on the disk and/or management information for managing user data recorded on the disk and/or an area for recording defect management information. The management information area may further include a trial writing area for the adjustment of laser power.

The management information area and the BCA function as the read-in zone, and a disk drive apparatus may generally require to read information in the read-in zone when the disk 1 is installed therein.

The data zone is an area in which user data is actually to be recorded. For example, the data zone of a rewritable disk, for example, records user data with a phase change mark.

The outermost circumference of the disk functions as a read-out zone. The read-out zone may record dummy data entirely or may record defect management information like the read-in zone. Furthermore, the read-out zone may be handled as a buffer area provided for an overrun during a seek.

2. Construction of Disk Drive Apparatus

Figure 2:
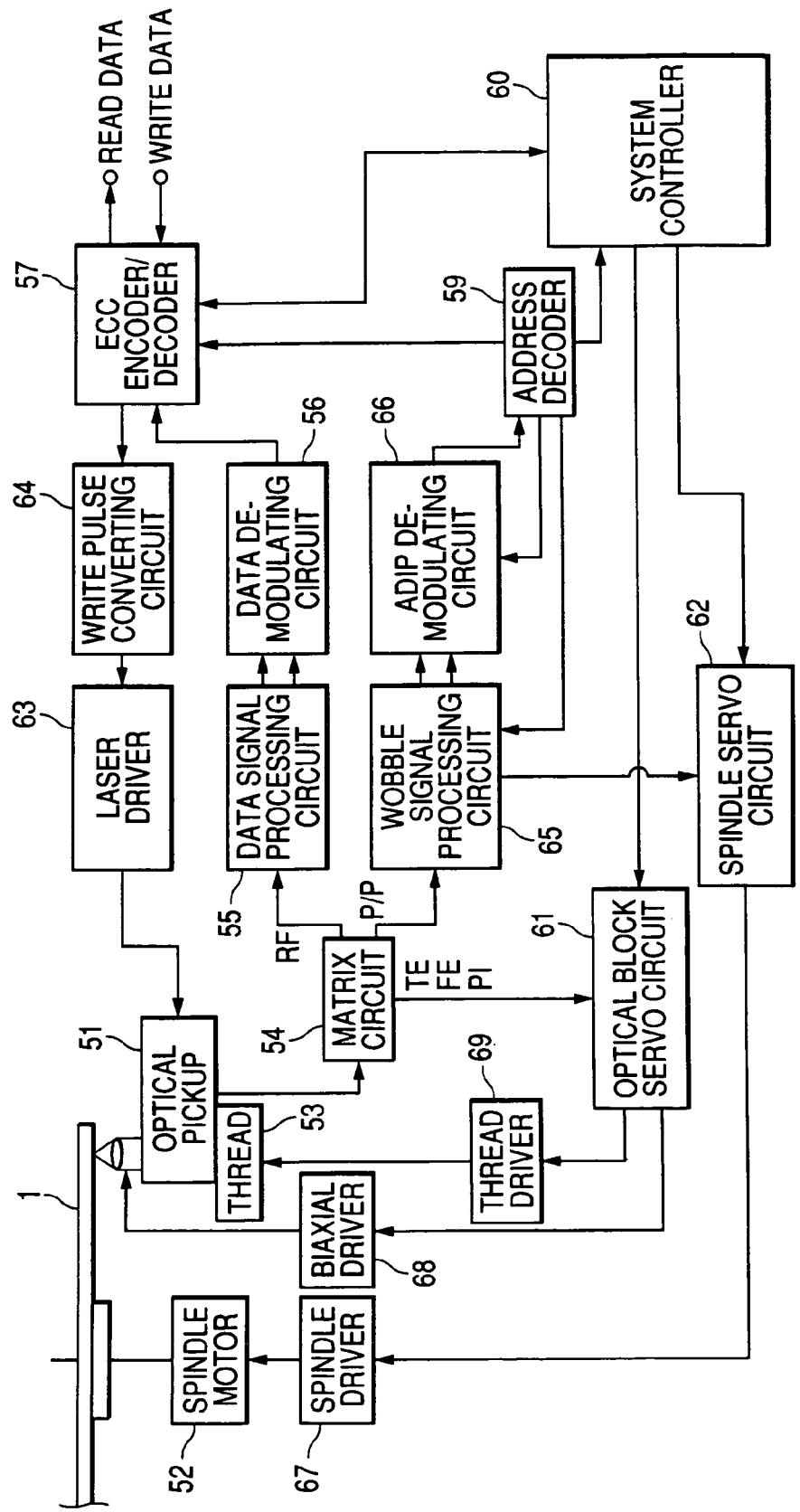
FIG. 2 is a block diagram of a disk drive apparatus of an embodiment of the invention.

Next, a disk drive apparatus of this embodiment will be described which can perform writing/reading on the disk 1 having the BCA as described above. FIG. 2 shows a construction of the disk drive apparatus. Here, the disk 1 is handled as a disk in Blu-ray disk format for the description of the construction of the disk drive apparatus compliant therewith.

The disk 1 is mounted on a turn table, not shown, and is driven to rotate at a constant linear velocity (CLV) by a spindle motor 52 during a writing/reading operation.

In data writing, user data is recorded on a track as a phase change mark by an optical pickup 51. In data reading, the recorded mark is read by the optical pickup.

Furthermore, ADIP information embedded as wobbling of a grooved track on the disk 1 is read out by the optical pickup 51.

Note that the management information area on the disk 1 records physical information of a disk, for example, as management information specially for read-only with an embossed pit or wobbling groove, and the information is also read by the pickup 51.

The information recorded in the BCA is also read by the optical pickup 51.

The pickup 51 internally includes a laser diode serving as a laser light source, a photodetector for detecting reflected light, an objective lens serving as the output end of laser light and an optical system for irradiating laser light to a disk recorded surface through the objective lens and conducting the reflected light to the photodetector. The laser diode outputs so-called blue laser of a wavelength of 405 nm, for example. The NA by the optical system is 0.85.

The objective lens in the pickup 51 is held by a biaxial mechanism movably in the directions of tracking and focus.

The entire pickup 51 is movable in the direction of radius of the disk by a thread mechanism 53.

The laser diode in the pickup 51 is driven to emit laser light in response to a drive signal (drive current) from a laser driver 63.

The reflected-light information from the disk 1 is detected by the photodetector, is converted to an electric signal in accordance with an amount of received light and is supplied to a matrix circuit 54.

The matrix circuit 54 includes a current-voltage converting circuit, matrix computing/amplifying circuit and so on for output current from multiple photoreceptors serving as the photodetector and generates a signal required by matrix computing processing.

For example, the matrix circuit 54 generates a high frequency signal (RF signal) corresponding to read data, a focus error signal FE for servo control, a tracking error signal TE and so on.

The matrix circuit 54 further generates a signal relating to wobbling of a groove, that is, a push/pull signal P/P serving as a signal for detecting wobbling.

The matrix circuit 54 further generates a pull-in signal PI serving as a low component of a sum signal of reflected light.

The RF signal (read data signal) output from the matrix circuit 54 is supplied to a data signal processing circuit 55. The focus error signal FE, tracking error signal TE and pull-in signal PI output from the matrix circuit 54 are supplied to an optical block servo circuit 61. The push/pull signal P/P output from the matrix circuit 54 is supplied to a wobble signal processing circuit 65.

The data signal processing circuit 55 performs binarizing processing and read-clock generating processing with a PLL on an RF signal. For example, the data signal processing circuit 55 may reproduce data read out as a phase change mark and supplies it to a data demodulating circuit 56.

The data demodulating circuit 56 performs demodulation processing on a run-length-limited code based on a read clock as decode processing in reading. The demodulated data is supplied to an ECC encoder/decoder 57.

The ECC encoder/decoder 57 performs ECC encode processing for adding an error correction code in writing and ECC decode processing for performing error correction in reading.

In reading, the ECC encoder/decoder 57 captures data demodulated by the data demodulating circuit 56 into an internal memory thereof, performs error-detection/correction processing and processing such as deinterleave thereon and obtains read data thereby.

The data decoded into read data by the ECC encoder/decoder 57 is read out based on a command from a system controller 60 and is output as read data to an external circuit system or external apparatus.

The push/pull signal P/P output from the matrix circuit 54 as a signal relating to wobbling of a groove is converted to digitalized wobble data by the wobble signal processing circuit 65. Furthermore, PLL processing generates a clock in synchronization with a push/pull signal.

The wobble data undergoes MSK demodulation or STW demodulation in an ADIP demodulating circuit 66, is demodulated to a data stream to be included in an ADIP address and is supplied to an address decoder 59.

The address decoder 59 decodes the supplied data to obtain the address value and supplies it to the system controller 60.

In writing, the write data supplied to the disk drive apparatus is sent to a memory in the ECC encoder/decoder 57 and is buffered therein.

The ECC encoder/decoder 57 in this case performs error correction code addition, interleaving, and subcode addition on the buffered write data as encode processing thereon.

The ECC-encoded data undergoes RLL (1-7) PP modulation (where RLL: Run Length Limited and PP: Parity preserve/Prohibit rmtr (repeated minimum transition runlength)) in a write pulse converting circuit 64. The encode clock serving as a reference clock for encode processing thereon in writing may be the clock generated from a wobble signal.

The write data created by the encode processing in the write pulse converting circuit 64 undergoes, in the laser driver 63, fine adjustment of optimum write power for the characteristic of the recorded layer, spot form of laser light, write linear velocity and so on, adjustment of a laser drive pulse waveform and so on as write compensation processing. Then, the laser driver 63 gives the write-compensated laser drive pulse to the laser diode within the pickup 51 to drive laser light emission. Thus, a pit (phase change mark) in accordance with the write data is formed on the disk 1.

Note that the laser driver 63 includes a so-called APC (Auto Power Control) circuit and controls to maintain constant laser output independent of the temperature therearound by monitoring laser output power based on the output from a detector for laser power monitoring in the pickup 51. The target value of the laser output in writing and reading is given from the system controller 60, and the laser output levels are controlled to the target value in writing and reading.

The optical block servo circuit 61 generates focus, tracking and thread servo drive signals from the focus error signal FE and tracking error signal TE from the matrix circuit 54 to implement the servo operations.

In other words, the optical block servo circuit 61 generates a focus drive signal and a tracking drive signal in accordance with a focus error signal FE and tracking error signal TE, and a biaxial driver 68 drives the focus coil and tracking coil in the biaxial mechanism within the pickup 51. Thus, the tracking servo loop and focus servo loop are formed by the pickup 51, matrix circuit 54, optical block servo circuit 61, biaxial driver 68 and biaxial mechanism.

The optical block servo circuit 61 further turns off the tracking servo loop in accordance with a track jump command or seek command from the system controller 60 and outputs a tracking drive signal for a jump/seek to implement a track-jump operation or seek operation.

The optical block servo circuit 61 further generates a thread error signal, which is obtained as a low component of a tracking error signal TE, and a thread drive signal based on access execution control from the system controller 60, and a thread driver 69 drives the thread mechanism 53. The thread mechanism 53 has a mechanism, not shown, including a main shaft for holding the pickup 51, a thread motor and a transmission gear. The thread motor is driven in accordance with a thread drive signal, whereby a required slide movement of the pickup 51 is achieved.

Note that the optical block servo circuit 61 internally includes a construction for controlling a BCA seek by using a pull-in signal PI, which will be described later.

The spindle servo circuit 62 controls the spindle motor 52 to perform CLV rotations.

The spindle servo circuit 62 obtains a clock, which is generated by the PLL processing on a wobble signal, as the current rotational velocity information of the spindle motor 52, compares it with predetermined CLV reference speed information and thus generates a spindle error signal.

In data reading, since a read clock (that is, clock to which decode processing refers) generated by the PLL within the data signal processing circuit 55 is the current rotational velocity information of the spindle motor 52, a spindle error signal can be generated by comparing the read clock with the predetermined CLV reference velocity information.

The spindle servo circuit 62 outputs the spindle drive signal generated in accordance with the spindle error signal and causes the spindle driver 67 to implement the CLV rotations of the spindle motor 52.

The spindle servo circuit 62 further generates a spindle drive signal in accordance with a spindle kick/brake control signal from the system controller 60 to, for example, start, stop, accelerate and decelerate the spindle motor 52.

The operations relating to the servo system and writing/reading system as described above are controlled by the system controller 60 including a microcomputer.

The system controller 60 performs processing in accordance with a command from an external circuit portion or external apparatus, not shown, or an operation by a user.

For example, when a write command is supplied thereto, the system controller 60 first moves the pickup 51 to the address to be written. Then, the ECC encoder/decoder 57 and write pulse converting circuit 64 are caused to perform encode processing as described above on supplied data (such as video data and audio data in a format such as MPEG). Then, the laser driver 63 drives the laser light emission in accordance with the data encoded as described above, whereby the writing is implemented.

When a read command is supplied for transferring data (video data in MPEG), for example, recorded on the disk 1, the system controller 60 first performs seek operation control for a commanded address. In other words, the system controller 60 commands the optical block servo circuit 61 to implement the access operation by the pickup 51 for the address specified by the seek command.

After that, the system controller 60 performs operational control required for transferring data in the commanded data section. In other words, the system controller 60 reads data from the disk 1, performs decoding/buffering and so on thereon in the data signal processing circuit 55, data demodulating circuit 56 and ECC encoder/decoder 57 and transfers the requested data.

Note that, in writing/reading data with a phase change mark as described above, the system controller 60 uses the ADIP address detected by the wobble signal processing circuit 65, ADIP demodulating circuit 66 and address decoder 59 to control accesses and write/read operations.

The disk drive apparatus shown in FIG. 2 may be implemented in various forms such as a disk drive apparatus internally contained in video camera equipment, a disk drive apparatus internally contained or connected to a host machine or personal computer serving as an AV system and a disk drive apparatus which independently performs writing/reading operations.

Having described the construction of the disk drive device serving as a writing/reading apparatus, the disk drive apparatus according to an embodiment of the invention may also be a write-only apparatus or a read-only apparatus.

3. Construction for BCA Seek

Once the disk 1 is installed in the disk drive apparatus, information in the BCA may be first read or management information in a management information area may be read before the information in the BCA is read. In both cases, when the disk 1 is installed in the disk drive apparatus, a BCA seek is performed as one of the initial operations, and the pickup 51 is transported by the thread mechanism 53 to the position for BCA reading to read the information in the BCA.

Figure 3:
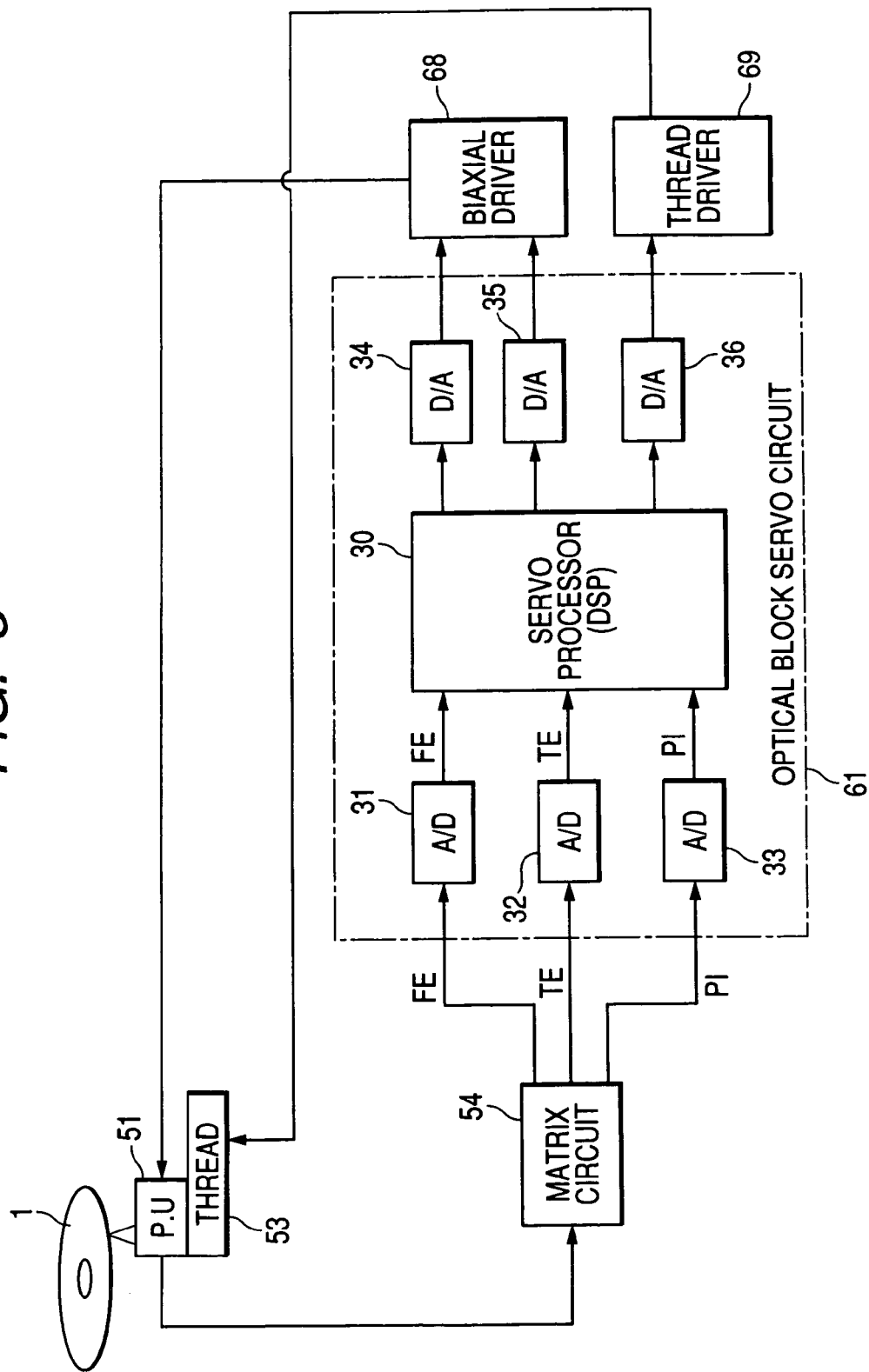
FIG. 3 is a block diagram of a servo system of the disk drive apparatus of the embodiment.
Figure 4:
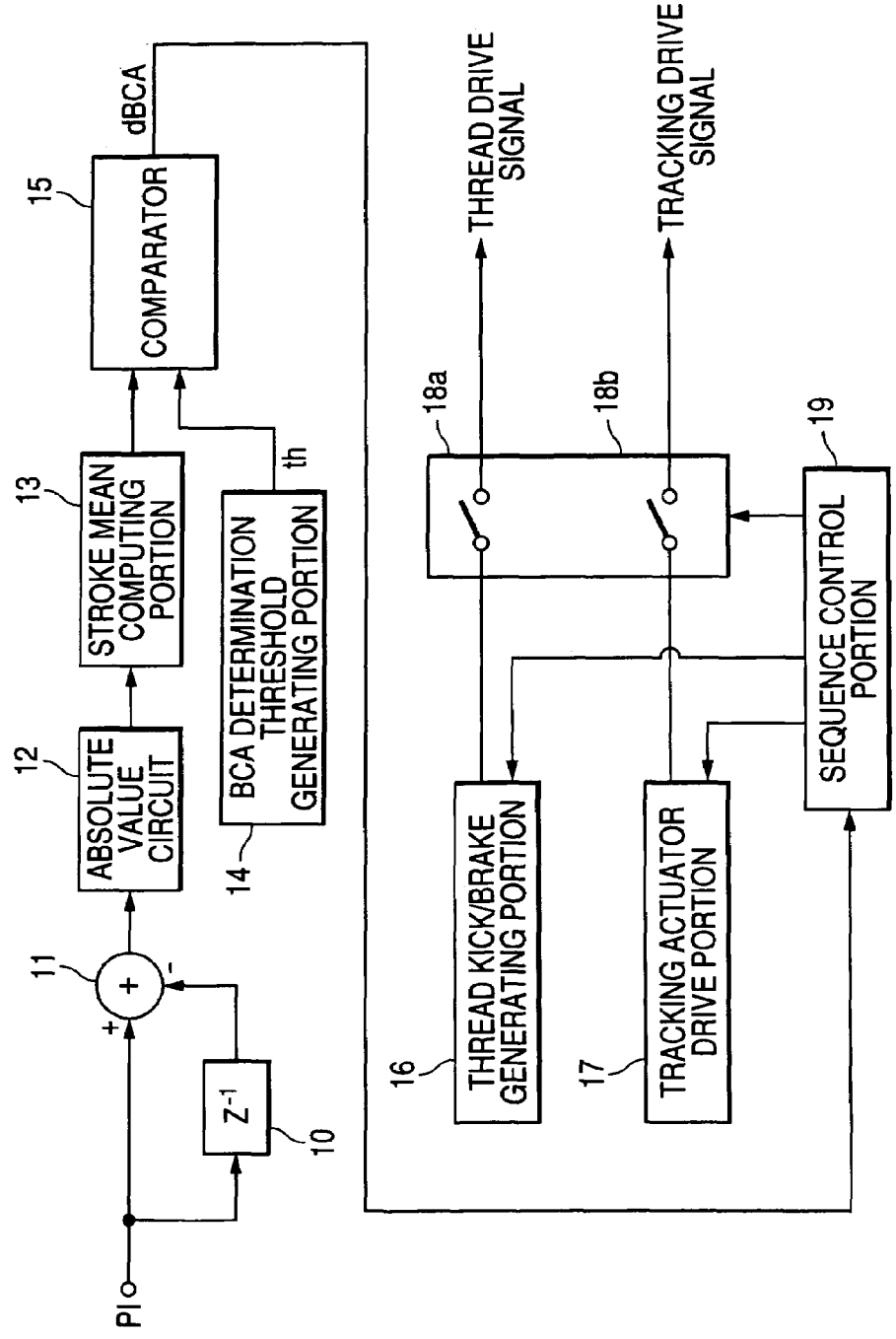
FIG. 4 is a block diagram of BCA-seek-related components of the disk drive apparatus of the embodiment.

The circuit part for implementing the BCA seek is shown in FIGS. 3 and 4.

FIG. 3 mainly shows a part including the optical block servo circuit 61 of the construction in FIG. 2. As described above, a focus error signal FE, a tracking error signal TE and a pull-in signal PI are supplied from the matrix circuit 54 to the optical block servo circuit 61.

The focus error signal FE, tracking error signal TE and pull-in signal PI are converted to digital data by A/D converters 31, 32 and 33, respectively, in the optical block servo circuit 61 and are supplied to a servo processor 30.

The servo processor 30 includes a digital signal processor (DSP) and generates a drive signal for implementing a servo operation as-described above.

In other words, the servo processor 30 further generates a focus drive signal for a focus servo operation based on a focus error signal FE or a focus drive signal for a focus search. The focus drive signal is converted to an analog signal by a D/A converter 34 and is supplied to the biaxial driver 68.

The servo processor 30 further generates a tracking drive signal based on a tracking error signal TE or a tracking drive signal for implementing a track jump, a seek or a forced shift of the position of an objective lens in the tracking direction. The tracking drive signal is converted to an analog signal by a D/A converter 35 and is supplied to the biaxial driver 68.

The servo processor 30 further generates a thread drive signal based on a thread error signal or a thread drive signal for thread kick/brake for a seek. The thread drive signal is converted to an analog signal by a D/A converter 36 and is supplied to the thread driver 69.

Based on the focus drive signal and tracking drive signal supplied to the biaxial driver 68, current is applied to the focus coil and tracking coil in the biaxial mechanism within the pickup 51, and a servo operation or forced movement operation on the objective lens is thus performed.

The operation for transporting the pickup 51 by the thread mechanism 53 is performed based on a thread drive signal given to the thread driver 69.

In this embodiment, the servo processor 30 includes the construction in FIG. 4 especially for a BCA seek operation.

A thread kick/brake generating portion 16 generates a kick pulse and brake pulse for starting and finishing the transportation of the thread mechanism 53. The kick pulse and brake pulse generated by the thread kick/brake generating portion 16 are supplied to the D/A converter 36 and thread driver 69 as thread drive signals through a switch 18a.

A tracking actuator drive portion 17 outputs a tracking drive signal for forcibly moving the objective lens in the tracking direction. The tracking drive signal output from the tracking actuator drive portion 17 is supplied to the D/A converter 35 and biaxial driver 68 through a switch 18b.

When the tracking servo and thread servo are on, the tracking drive signal and thread drive signal generated within the servo processor 30 based on a tracking error signal TE and thread error signal as described above are supplied to the biaxial driver 68 and thread driver 69. For that, in order to output the thread drive signal from the thread kick/brake generating portion 16 in FIG. 4 to the thread driver 69, the thread servo system is turned off. In order to output the tracking drive signal from the tracking actuator drive portion 17 to the biaxial driver 68, the tracking servo system is turned off.

For the operational control for a BCA seek, a sequence control portion 19 controls the thread kick/brake generating portion 16 and tracking actuator drive portion 17 to control the output of the thread drive signal and tracking drive signal.

The sequence control portion 19, thread kick/brake generating portion 16 and tracking actuator drive portion 17 generate drive signals for an actual BCA seek, and a determination signal dBCA is input to the sequence control portion 19 for BCA determination (that is, determination on whether the pickup 51 has been transported to the BCA or not) in a BCA seek sequence process.

The pull-in signal PI is used for the generation of the determination signal dBCA.

The pull-in signal PI digitalized by the A/D converter 33 in FIG. 3 is supplied to a delay circuit 10 and subtractor 11 in FIG. 4 in the servo processor 30. The delay circuit 10 includes, for example, a register and delays the pull-in signal PI by one clock timing and supplies it to the subtractor 11. Then, the subtractor 11 outputs a difference between the input pull-in signal PI and the pull-in signal PI input one clock before, that is, a difference between pull-in signals PI in the time-axis direction.

The difference value output from the subtractor 11 is converted to an absolute value in the absolute value circuit 12 and is supplied to a stroke mean computing portion 13. Every time a difference value, which has been converted to the absolute value, is input to the stroke mean computing portion 13 in a clock timing, the stroke mean computing portion 13 calculates a mean value of the difference values, which have been converted to the absolute values, in a predetermined clock period from the present to the past, that is, the stroke mean value and outputs it to a comparator 15.

A threshold value th is supplied from a BCA determination threshold generating portion 14 to the comparator 15 as a comparison reference value, and the comparator 15 compares a stroke mean value and the threshold value th and outputs the comparison result as a determination signal dBCA.

The operation for generating the determination signal dBCA will be described with reference to FIGS. 5A to 5D.

FIG. 5A shows level changes of an input pull-in signal PI. They are level changes of a pull-in signal PI, which can be observed when the pickup 51 is transported from one position to a BCA, for example.

The pull-in signal PI does not change largely as indicated in a period TA when the pickup 51 faces to the data zone or management information area.

However, when the pickup 51 enters to the BCA having a barcode-like pattern, the pull-in signal PI changes largely and continuously for a certain period of time in accordance with the pattern, as shown in FIG. 5A.

FIG. 5B shows the difference absolute values obtained for the pull-in signal PI through the delay circuit 10, subtractor 11 and absolute value circuit 12. In other words, large difference absolute values can be obtained in the BCA.

FIG. 5C shows stroke mean values for the difference absolute values. That is, after the reach to the BCA where large difference absolute values are observed continuously, the stroke mean values increase. Therefore, the determination signal dBCA in FIG. 5D as a result of the comparison between the stroke mean value and threshold value th by the comparator 15 shows whether the pickup 51 has reached the BCA or not.

The sequence control portion 19 uses the determination signal dBCA to perform BCA seek control.

4. First BCA Seek Operation Example

A BCA seek operation example to be implemented in this construction will be described.

Figure 6:
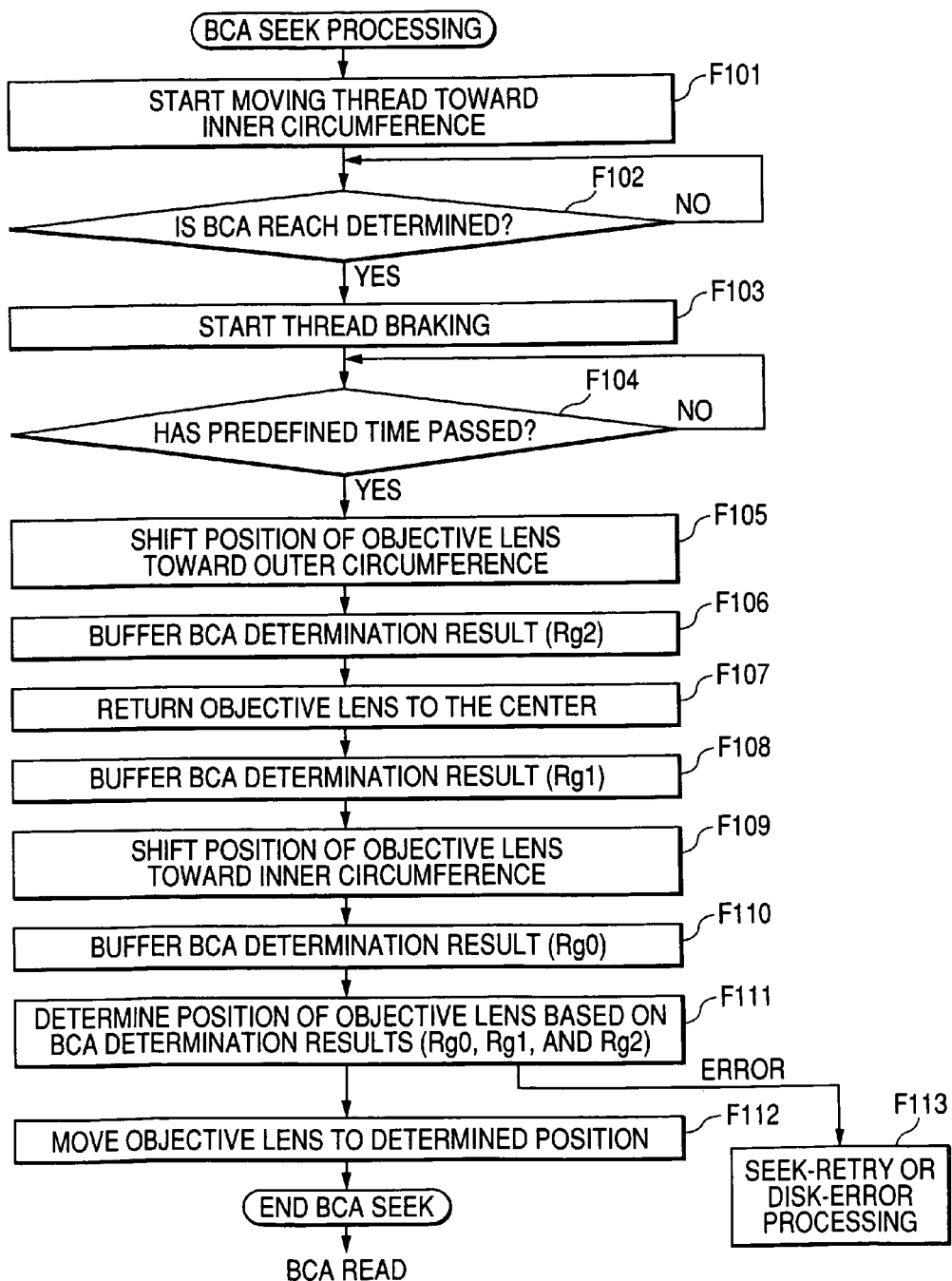
FIG. 6 is a flowchart of a processing example of a first BCA seek operation of the embodiment.

FIG. 6 shows processing of the sequence control portion 19 for a BCA seek. FIGS. 7A to 7D show operational waveforms during a BCA seek.

When a command for a BCA seek is given from the system controller 60 shown in FIG. 2 to the servo processor 30, the sequence control portion 19 in FIG. 4 in the servo processor 30 causes the thread mechanism 53 to start moving the pickup 51 toward the inner circumference of the disk in step F101 in FIG. 6.

Figure 7:
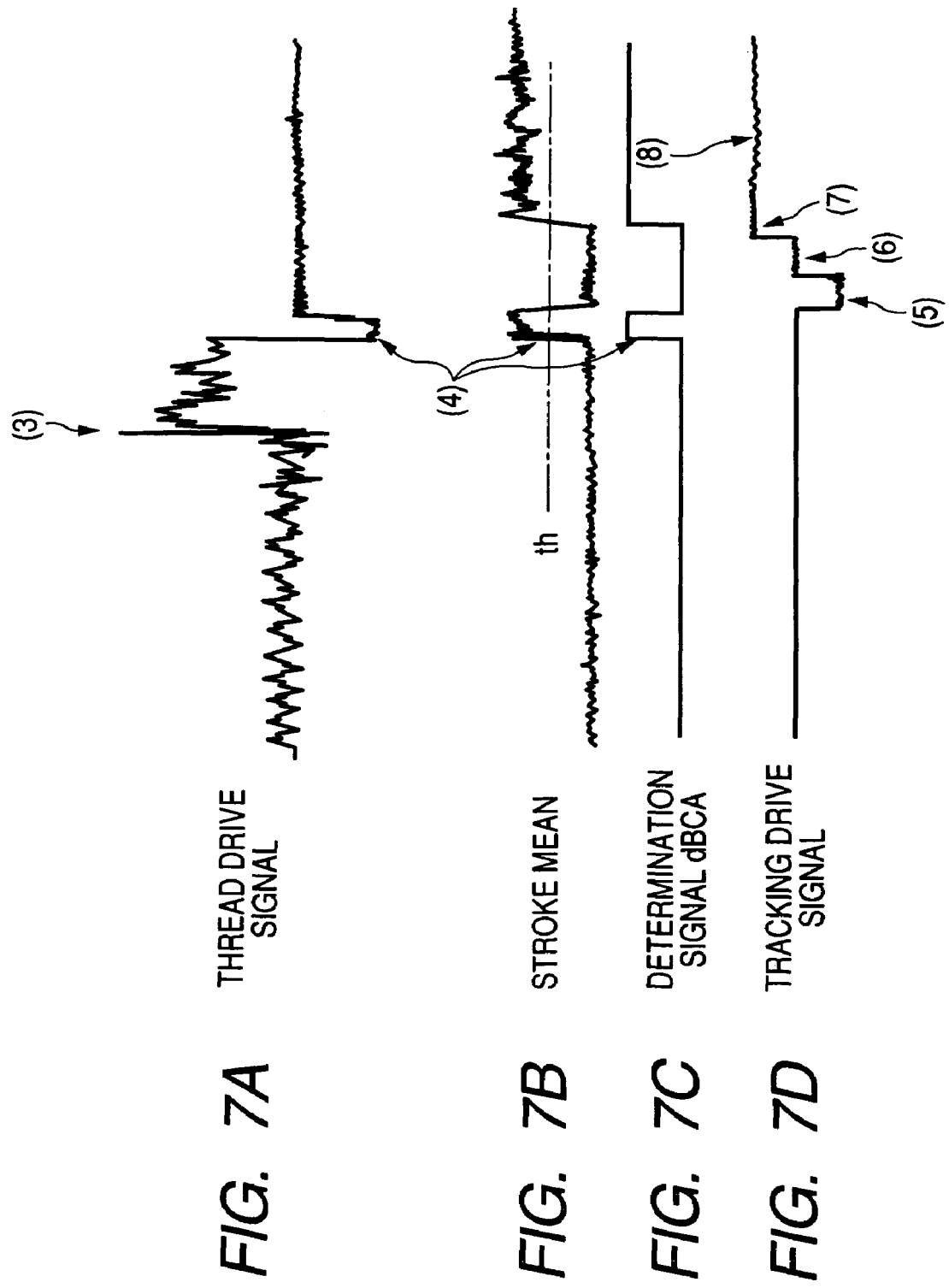
FIGS. 7A to 7D are explanatory diagrams of signal waveforms during the first BCA seek operation of the embodiment.

In this case, the sequence control portion 19 turns off the thread servo and turns on the switch 18a and thus causes the thread kick/break generating portion 16 to output a thread kick pulse toward the inner circumference. This is supplied to the thread driver 69 as a thread drive signal, and the transportation of the pickup 51 by the thread mechanism 53 is thus started. FIG. 7A shows the thread drive signal waveform, and the kick pulse in the timing indicated by (3) of figure starts the transportation toward the inner circumference.

Note that the servo processor 30 keeps the focus servo on while turning the tracking servo off before starting the transportation in step F101. However, for the tracking, so-called neutral servo may be applied during a BCA seek for holding the objective lens at the center of the field of vision.

After the transportation of the pickup 51 by the thread mechanism 53 is started, the sequence control portion 19 monitors the determination signal dBCA in step F102 and determines whether the pickup 51 has reached the BCA or not.

The transportation by the thread mechanism 53 is continued until the BCA reach is determined based on the determination signal dBCA.

Once the reach of the pickup 51 to the BCA is determined based on the determination signal dBCA at some point of time, the sequence control portion 19 moves from step F102 to step F103 where the sequence control portion 19 performs processing of stopping the thread mechanism 53. In other words, the sequence control portion 19 causes the thread kick/break generating portion 16 to output a thread break pulse.

FIGS. 7B and 7C show stroke mean values and a determination signal dBCA, respectively, and the sequence control portion 19 causes the output of a thread drive signal as a brake pulse in response to the rising edge of the determination signal dBCA in the timing indicated by (4).

The sequence control portion 19 stands by for a predefined period of time in step F104. That is, the sequence control portion 19 stands by until the thread mechanism 53 stops in response to the brake pulse. After a lapse of the predefined period of time, the transportation by the thread mechanism 53 is finished.

Here, since the transportation by the thread mechanism 53 is finished based on the determination signal dBCA as described above, the pickup 51 is supposed to be at the position where the pickup 51 can read information in the BCA when the thread mechanism is stopped by the break pulse.

However, in reality, the position may not be always the optimum position for reading the information in the BCA.

For example, the pickup 52 may not be always stopped as intended by the brake pulse for some levels (height of pulse voltage and/or time applied) of the brake pulse for the thread stop and/or some mechanical accuracy of the thread mechanism 53, for example. In some cases, an excessively high level of the brake pulse may move the pickup 51 slightly back toward the outer circumference.

Furthermore, when the pickup 51 stops near the boundary of the BCA and the management information area, the position of the objective lens (that is, the laser irradiation position) may be off the BCA due to the decentered disk 1.

In other words, when the reach to the BCA is detected from the determination signal dBCA, and the operation for stopping the thread mechanism 53 is started immediately thereafter, the pickup 51 is ideally stopped near the substantially center of the BCA since the pickup 51 moves toward the inner circumference before the complete stop. However, in some cases, the pickup 51 may stop near the boundary of the BCA and the management information area due to the backward movement of the thread mechanism 53. As a result, the pickup 51 may not read the information in the BCA well.

Accordingly, after the stop of the thread mechanism 53, processing of controlling the objective lens to an optimum position is performed in this embodiment such that the BCA read can be implemented properly in step F105 and subsequent steps.

After the stand-by until the thread stop and the stop of the pickup 51 in step F104, the sequence control portion 19 in step F105 first shifts the position of the objective lens toward the outer circumference in the range of the field of vision within the pickup 51. In other words, the sequence control portion 19 controls the tracking actuator drive portion 17 with the switch 18b on to output a tracking drive signal for forcibly moving the objective lens toward the outer circumference. The tracking drive signal is indicated by (5) in FIG. 7D. Thus, the position of the objective lens within the pickup 51 is shifted toward the outer circumference.

Under this condition, the sequence control portion 19 in step F106 buffers the value of the determination signal dBCA. For example, a register Rg2 may hold the value of the determination signal dBCA.

Then, in step F107, the sequence control portion 19 stops the tracking drive signal toward the outer circumference and returns the objective lens to the midpoint. The tracking drive signal now has the state indicated by (6) in FIG. 7D. Then, in step F108, the sequence control portion 19 buffers the value of the determination signal dBCA with the objective lens at the midpoint. For example, a register Rg1 may hold the value of the determination signal dBCA.

Then, in step F109, the sequence control portion 19 shifts the position of the objective lens toward the inner circumference in the range of the field of vision within the pickup 51. In other words, the sequence control portion 19 controls the tracking actuator drive portion 17 with the switch 18b on to output a tracking drive signal for forcibly moving the objective lens toward the inner circumference ((7) in FIG. 7D). Thus, the position of the objective lens is shifted toward the inner circumference within the pickup 51.

Under this condition, the sequence control portion 19 in step F110 buffers the value of the determination signal dBCA. For example, a register Rg0 may hold the value of the determination signal dBCA.

Note that the operations for capturing the determination signal dBCA at the different positions of the objective lens may be performed in any order.

For example, since the objective lens is free at the midpoint upon thread stop, the register Rg1 may capture the value of the determination signal dBCA at that state, and the position of the objective lens may be then shifted toward the inner and outer circumferences and the registers Rg0 and Rg2 may capture the values of the determination signal dBCA.

In the processing in steps F105 to F110, for example, the registers Rg0, Rg1 and Rg2 may capture the values of the determination signal dBCA (BCA determination results) when the position of the objective lens is shifted in three levels, and, then in step F111, the optimum position of the objective lens for a BCA read may be determined based on the values in the registers Rg0, Rg1 and Rg2.

Then in step F112, the objective lens is controlled to the determined optimum position, and the sequence for the BCA seek is finished. After that, the BCA read, that is, reading information in the BCA is performed.

The processing of determining an optimum position in step F111 will be described with reference to FIGS. 8 and 9.

FIG. 8 shows patterns of the values of the determination signal dBCA captured by the registers Rg0, Rg1 and Rg2. Here, "Y" refers to the fact that the determination signal dBCA is at H-level, that is, that the reach to BCA is determined, and "N" refers to the fact that the determination signal dBCA is at L-level, that is, that the reach to BCA is not determined.

Pattern P1 (YYY) that the registers Rg0, Rg1 and Rg2 have as a result of the BCA determination on the three positions of the objective lens on the inner circumferential side, at the center and on the outer circumferential side refers to the case that the laser is irradiated to the BCA at any of the three positions of the objective lens.

Figure 9:
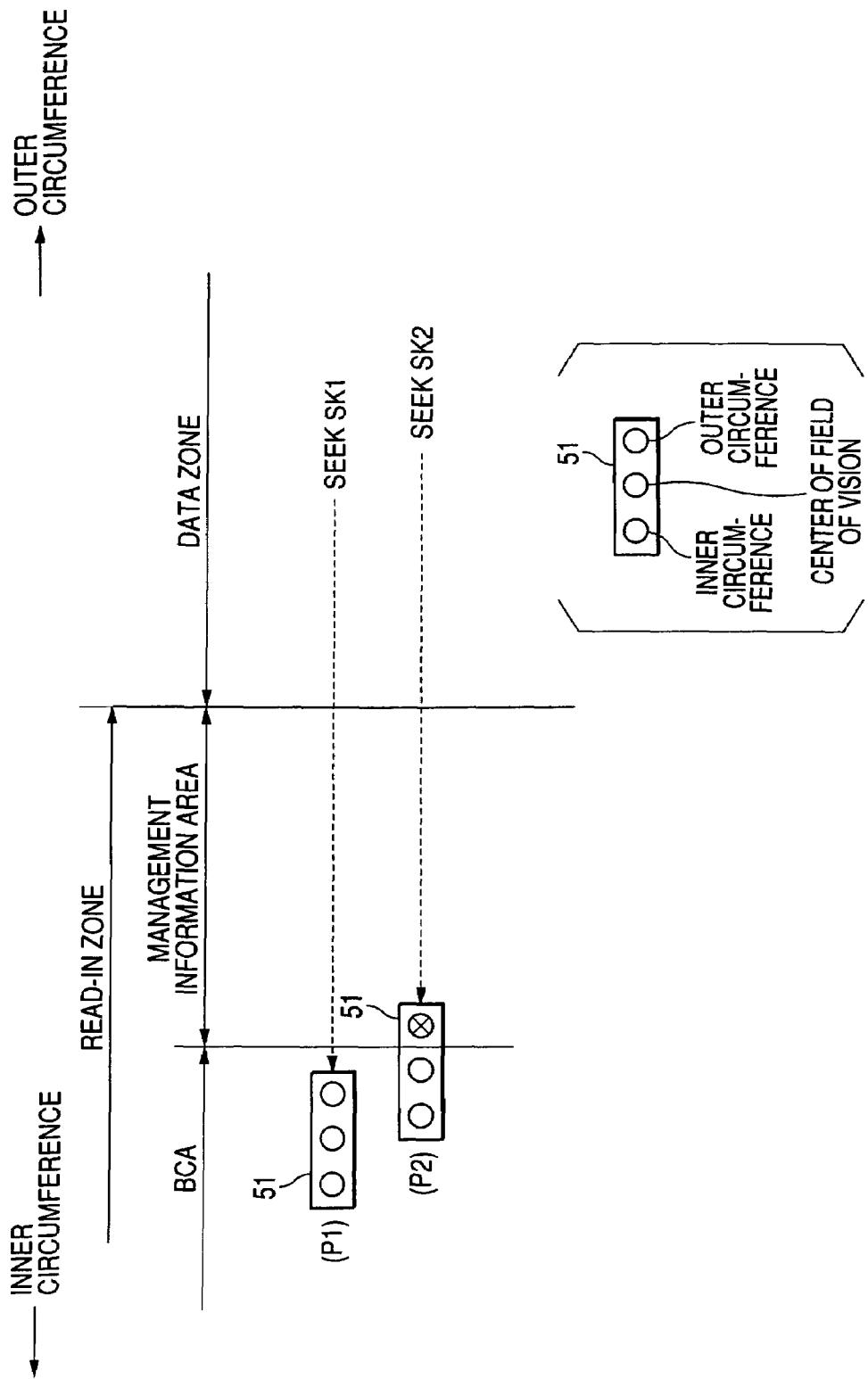
FIG. 9 is an explanatory diagram of an operational state during the first BCA seek of the embodiment.

FIG. 9 schematically shows the areas of the disk 1 and the positions of the pickup 51, for example. The field of vision of the objective lens fell within the BCA when the pickup 51 stops results in Pattern P1 as indicated by Seek SK1. In this case, a BCA read may be considered possible with the objective lens at any positions. However, since the objective lens may be positioned near the boundary on the inner circumferential side or outer circumferential side of the BCA in some cases, the center of the field of vision is determined as the optimum position of the objective lens. This is because a BCA read may not be possible due to a decentered disk when the objective lens is close to an edge of the BCA, and the center of the field of vision determined as the optimum position of the objective lens allows the implementation of a read at a position closer to the center of the BCA than an edge of the BCA.

Pattern P2 (YYN) that the registers Rg0, Rg1 and Rg2 have as a result of the BCA determination on the three positions of the objective lens on the inner circumferential side, at the center and on the outer circumferential side refers to the case that the laser is irradiated to the BCA when the objective lens is on the inner circumferential side and at the center of the field of vision but the irradiated light is out of the BCA when the objective lens is moved toward the outer circumference.

FIG. 9 shows the case that the pickup 51 stops with the field of vision across the outer circumferential edge of the BCA (that is, the boundary of the BCA and the management information area) as indicated by Seek SK2.

In this case, the inner circumferential side is determined as the optimum position of the objective lens such that a BCA read can be implemented at a position closer to the center of the BCA as much as possible.

Pattern P3(YNN) in FIG. 8 refers to the case that the laser is irradiated to the BCA when the objective lens is on the inner circumferential side but the irradiated light is out of the BCA when the objective lens is at the center of the field of vision and on the outer circumference. In this case, the inner circumferential side is naturally determined as the optimum position of the objective lens.

Note that the Pattern P3 example is shown as the waveforms in FIGS. 7A to 7D. In this case, the position of the objective lens is shifted as indicated by (5), (6) and (7) in FIG. 7D, and the determination signal dBCA rises in the timing indicated by (7) when the objective lens is moved toward the inner circumference, from which the reach to the BCA is determined.

Therefore, the inner circumferential side is determined as the optimum position of the objective lens, and (8) in FIG. 7D indicates the state that the objective lens is kept on the inner circumferential side in step F112.

Pattern P4 (NYY) in FIG. 8 refers to the case that laser is not irradiated to the BCA with the objective lens being on the inner circumferential side. This may be considered as that the pickup 51 stops near the inner circumferential edge of the BCA.

Pattern P5 (NNY) may also refer to the case that the pickup 51 stops near the inner circumferential edge of the BCA. From Patterns P4 and P5, the outer circumferential side is determined as the optimum position of the objective lens.

From Pattern P6 (NYN) resulting from some factors, the center of the field of vision is determined as the optimum position of the objective lens.

Pattern P7 (NNN) results in an error.

The determination of the error may be considered as that the objective lens does not reach the BCA at all. Thus, the processing moves from step F111 to step F113 where the BCA seek is retried. For example, the processing from step F101 may be performed again.

When a predetermined number of retries result in errors, disk error processing may be performed. For example, the installed disk may be handled as a disk with no BCA.

In this embodiment, the BCA seek operation as described above is performed. That is, the pickup 51 is moved to the inner circumference by the thread mechanism 53. If the reach to the BCA is determined based on the determination signal dBCA, brake processing is performed on the thread mechanism 53. After the standby until the stop of the thread mechanism 53, the position of the objective lens is shifted, and the BCA determination results (determination signal dBCA) are checked at the positions of the objective lens. The optimum position of the objective lens is determined based on the results, and the objective lens is controlled to the optimum position, followed by the end of the BCA seek sequence. Then, a BCA read is performed.

The BCA seek in this embodiment can realize the constructional superiority and the accurate operation since the reach to the BCA is determined based on the determination signal dBCA generated based on a pull-in signal PI.

In other words, the use of a thread position sensor may not be required for detecting the position where the BCA seek transportation is stopped. Furthermore, since the BCA seek does not depend on the number of counts of steps by the stepping motor in the thread mechanism 53 and/or the number of the rotational encode counts of the DC motor, the thread transportation is not finished at an improper position due to a mechanical error in accuracy.

Furthermore, this embodiment can achieve higher reliability in seek operations since the optimum position of the objective lens is searched after the stop of the thread transportation before a BCA read at the optimum position.

This is because optimizing the position of the objective lens allows a proper BCA read even if the brake control over the thread transportation is not optimum and the pickup 51 is stopped near an edge of the BCA. Apparently, high reliability can be achieved against influences from a decentered disk and/or interference.

The high reliability of the BCA seek may further reduce the time for the initial operation of the disk drive apparatus when a disk installed therein, and a requested writing operation or reading operation can be started fast.

It should be noted that a determination signal dBCA for BCA determination is generated based on a pull-in signal PI in this embodiment.

The pull-in signal PI is a low component of a reflected-light sum signal.

Here, the form of an RF signal, serving as a read data signal, may depend on the type of disk or the detection method, and the RF signal may be a sum signal of reflected light detected by a photodetector within the pickup or may be a difference signal (push/pull signal).

In other words, an RF signal may generally be a high component of a sum signal of reflected light (that is, high component of a pull-in signal PI) or a high component of a push/pull signal.

On the other hand, a pull-in signal PI is a sum signal of reflected light, is a low signal including a DC component of a reflected light sum signal and has the RF signal band attenuated by a low-pass filter.

Accordingly, the use of a pull-in signal PI is preferable in consideration of various systems or a system in which the RF signal generation computing is switched in accordance with the type of a disk so that the system can be compliant with various types of disk.

Alternatively, an RF signal may be used to determine the BCA reach in a system in which the RF signal is a sum signal.

However, the A/D converter (such as the A/D converters 31, 32 and 33 in FIG. 3) installed for obtaining information on a servo band to be input to the servo processor 30 does not generally cover the RF signal band.

In other words, using an RF signal, like this embodiment, as a signal to be used for generating a determination signal dBCA in processing in the servo processor 30 may require a high performance A/D converter which operates at a high sampling frequency as the A/D converter 33. This is disadvantageous in construction and costs.

From these points, a pull-in signal PI is most preferably used to generate a determination signal dBCA.

Furthermore, the difference values of a pull-in signal PI are converted to absolute values, and the stroke mean is calculated therefrom and is compared with a threshold value th to generate the determination signal dBCA. The conversion of the difference values to absolute values allows the frequency of level changes of the pull-in signal PI to be properly reflected on the stroke mean. In other words, the stroke mean value increases as the frequency of level changes increases without cancellation between positive and negative difference values. Thus, a highly reliable determination signal dBCA may be generated since the stroke mean value properly increases in an area having frequent level changes, that is, in a BCA area.

In other words, because of the stroke mean calculated from difference absolute values, no other areas than the area with the pull-in signal PI having a series of large level changes to some extent (that is, no other areas than a BCA) is determined as a BCA, and BCA misdetermination may hardly occur with a single level change due to a defect (such as a scar and a stain), for example, on a disk.

Furthermore, since the circuit construction for generating a determination signal dBCA as described with reference to FIG. 4 is extremely simple, which is not a large load as a DSP of the servo processor 30.

5. Second BCA Seek Operation Example

Next, a second BCA seek operation example will be described.

A BCA seek may be properly completed in many cases by performing thread transportation with the determination signal dBCA monitored as described above. This is because, as described above, the determination signal dBCA allows highly accurate BCA determination.

However, when the disk 1 is a phase-change recording disk or a dye change recording disk, the determination signal dBCA may result in misdetermination of the data zone as the BCA in a very few cases.

This will be described with reference to FIG. 11A.

Figure 11A:
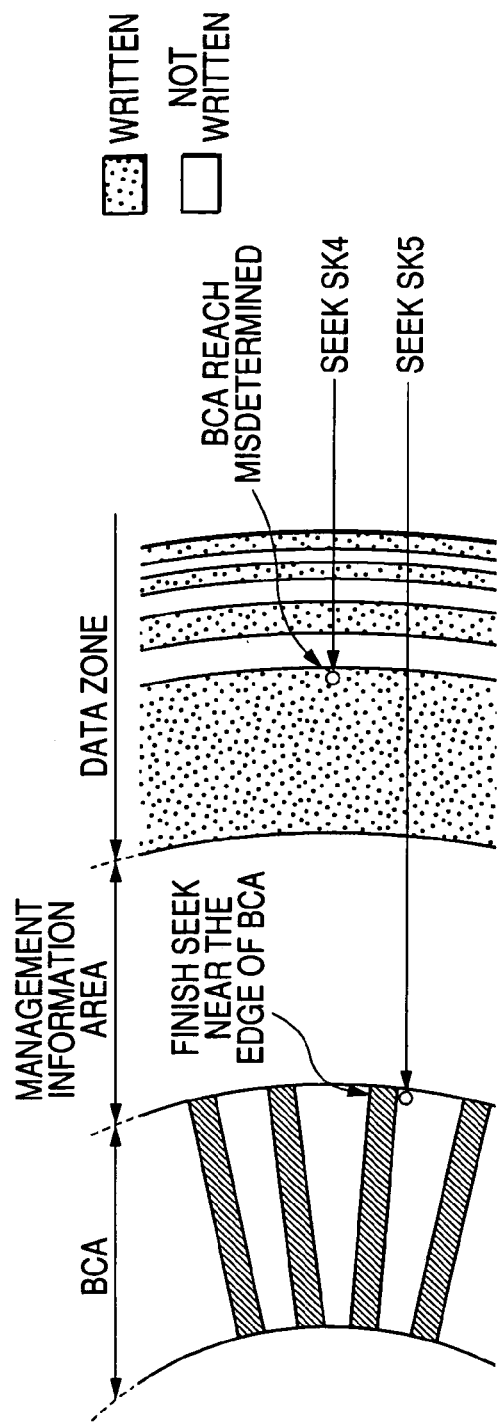
FIGS. 11A and 11B are explanatory diagrams of operational states during the second BCA seek operation of the embodiment.

FIG. 11A schematically shows a state on the disk 1 having a BCA with a radial barcode-like recording pattern, a management information area and a data zone partially with user data already recorded.

Here, as shown in FIG. 11A, the data zone has, alternately in the direction of the radius, an area having a part (including one or multiple tracks) in which user data has been already recorded and an area in which user data has not been recorded. The recorded area and unrecorded area have different reflectivities, which may have an influence on a pull-in signal PI, which is a sum signal of reflected light.

In other words, when the part alternately having the recorded area and unrecorded area in the direction of the radius with short spaces in this way occurs in the direction of the radius repeatedly to some extent, the pull-in signal PI repeatedly has larger level changes in the area during the seek transportation indicated as Seek SK4, resulting in the generation of a determination signal dBCA which misdetermines the BCA reach. Thus, a BCA seek error occurs.

Therefore, since the occurrence of such a recording state may not be prevented, a method for preventing the misdetermination against such a recording state is naturally demanded.

As described above, the thread mechanism is preferably stopped in the BCA but not near an edge of the BCA as much as possible. This is because a BCA read may not be properly implemented near the edge in some cases due to a decentered disk or the field of vision of the objective lens.

For example, a case that a seek ends near an edge of the BCA, as indicated by Seek SK5 in FIG. 11A, will be considered below.

In fact, even under this state, a BCA read may be possible in many cases by optimizing the position of the objective lens as described in the operation example above. However, in order to increase the reliability of a BCA read, the transportation of the pickup 51 is preferably finished near the center of the BCA if possible, and Pattern P1 in FIG. 8 is preferably obtained by optimizing the position of the objective lens.

Accordingly, the second BCA seek operation example of this embodiment implements a seek sequence in consideration of these factors.

Figure 10:
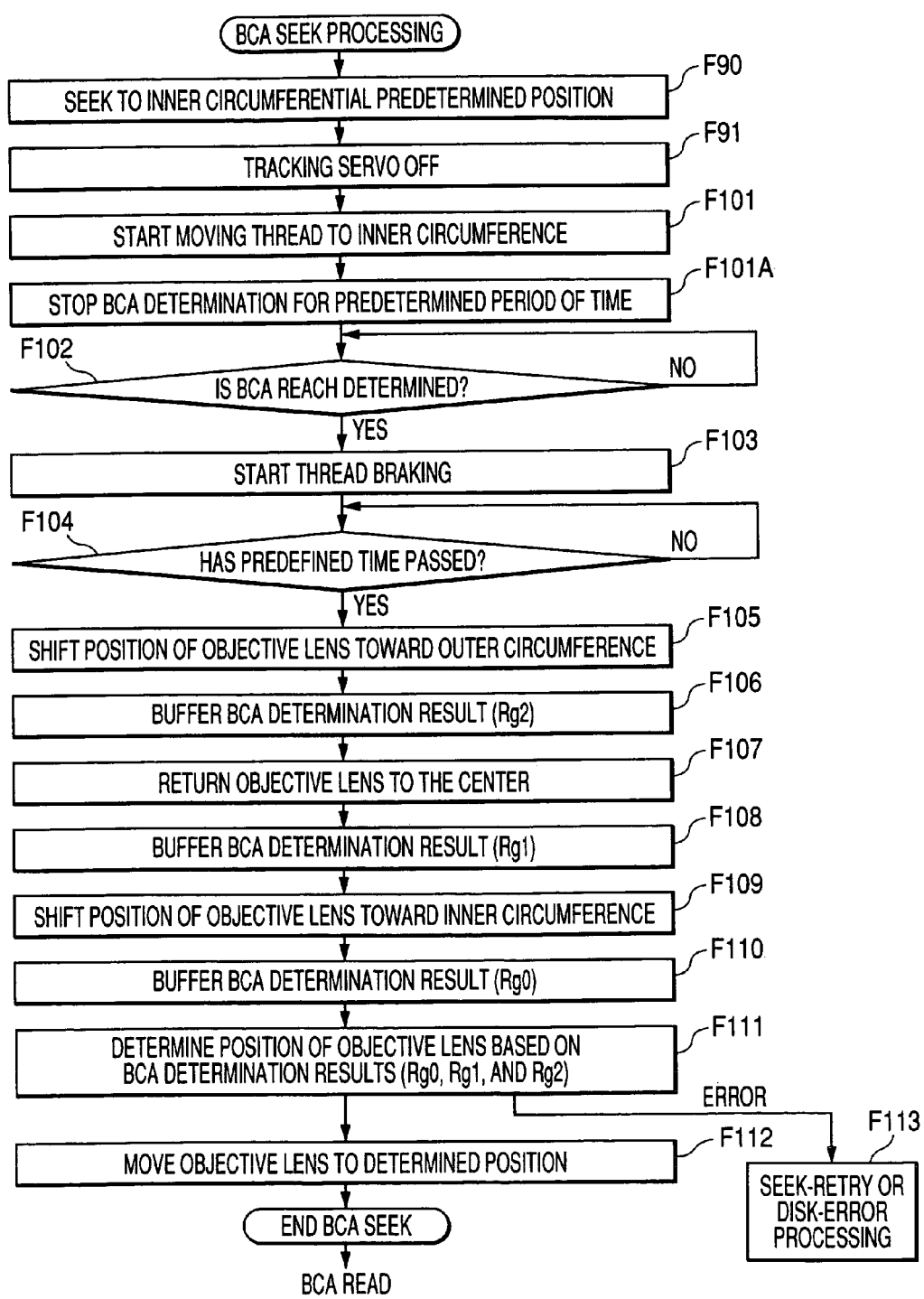
FIG. 10 is a flowchart of a processing example of a second BCA seek operation of the embodiment.

FIG. 10 shows the processing to be performed in the second BCA seek operation example by the sequence control portion 19. In FIG. 10, the same step numbers are given to the same processes as those in FIG. 6. FIG. 11B and FIGS. 12A to 12D show a seek operation state and operational waveforms, respectively.

When the system controller 60 commands a BCA seek to the servo processor 30, the sequence control portion 19 first in step F90 implements a seek for an inner circumferential predetermined position (predetermined address) as a pre-seek before the seek for the BCA. For example, the sequence control portion 19 implements a seek to a specific address AD1 within the management information area shown in FIG. 11B.

Figure 11B:
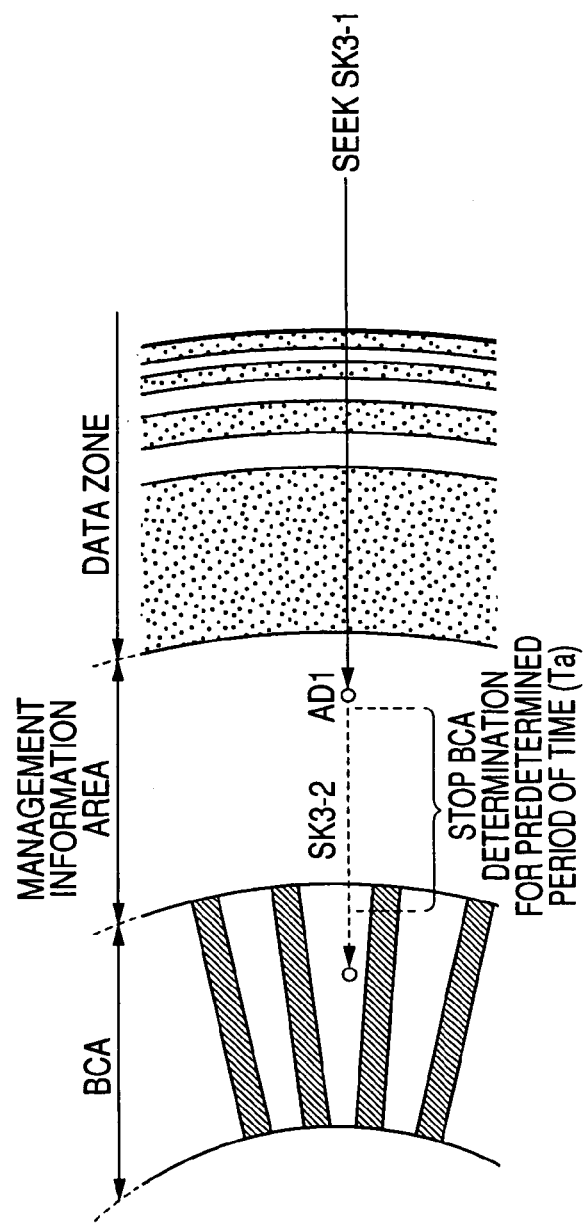

Thus, the sequence control portion 19 causes the thread kick/brake generating portion 16 to sequentially generate a required thread kick pulse as indicated by (1) and (2) in FIG. 12A, which implements the seek for the address AD1 as indicated by Seek SK3-1 in FIG. 11B.

After Seek SK3-1 completes and the pickup 51 reaches the address AD1, the tracking servo is turned off in step F91 in FIG. 10, and the thread transportation toward the inner circumference is started for the BCA in step F101. In other words, the sequence control portion 19 causes the thread kick/brake generating portion 16 to output a thread kick pulse as indicated by (3) in FIG. 12A and start Seek SK3-2 in FIG. 11B.

In this case, after the start of the BCA seek in step F101, the sequence control portion 19 stands by for a predetermined period of time without monitoring the determination signal dBCA in step F101A.

Then, the processing moves to step F102 after a lapse of the predetermined period of time, and, when the detection of the determination signal dBCA is started and the BCA reach is determined based on the determination signal dBCA, thread stop processing is performed in step F103. In other words, a brake pulse is generated in a timing indicated by (4) in FIG. 12A.

The processing from step F103 to step F113 is the same as the processing in those steps in FIG. 6, the repetitive description of which will be omitted herein.

In this operation example, a seek for the specific address AD1 is performed in the pre-seek in step F90. For example, the specific address may be an address within management information area.

Performing the pre-seek eliminates the possibility of the BCA misdetermination in the data zone.

In other words, the address AD1 is defined as the inner circumferential position rather than the area which may possibly have a recorded area and an unrecorded area alternately. For example, the target address AD1 may be defined such that all of the inner circumferential side with respect to the address AD1 can be a read-only management information area.

Thus, a BCA seek after the pre-seek for the address AD1 does not pass through the area in which the misdetermination may occur with some recording states. Therefore, the thread transportation is not stopped at an improper position due to the misdetermination of the BCA reach.

The BCA seek after the reach to the address AD1 does not monitor the determination signal dBCA for a predetermined period of time. The determination signal dBCA is checked after a lapse of the predetermined period of time, and the thread stop control is performed based on the result.

For example, in the waveforms in FIGS. 12A to 12D, a kick pulse is generated in the timing indicated by (3), and the brake pulse is not generated for a predetermined period of time Ta after a BCA seek is started even if the determination signal dBCA rises as shown in the figures. In the case in FIGS. 12A to 12D, since the determination signal dBCA already indicates the BCA reach at the time when the predetermined period of time Ta has passed, the brake pulse is not generated to stop the thread mechanism until the time indicated by (4).

FIG. 11B shows this state in Seek SK3-2. In this case, even after the pickup 51 reaches the BCA, the transportation is continued to some extent before brake control is performed. Thus, the pickup 51 is stopped near the center of the BCA to some extent.

In other words, not performing the brake control for the predetermined period of time Ta allows the seek in which the pickup 51 is stopped near the center of the BCA as much as possible.

In the processing of optimizing the position of the objective lens in step F105 and subsequent steps, the BCA reach can be determined at any position in the outer circumference, at the center of the field of vision and in the inner circumference when the pickup 51 is stopped near the center of the BCA, which results in Pattern P1 in FIG. 8. FIG. 12D shows a state in which the determination signal dBCA has H-level at any position when the objective lens is moved to the outer circumference, center of the field of vision and inner circumference as the tracking drive signals indicated by (5), (6) and (7). In this case, the optimum position of the objective lens is the center of the field of vision, and the BCA seek is completed under the state that the objective lens is controlled to the center of the field of the vision as indicated by (8).

The detection of the determination signal dBCA not performed for the predetermined period of time Ta allows the completion of a seek near the center of the BCA as much as possible, which can improve the reliability of the BCA read thereafter.

The standby for the predetermined period of time Ta before the BCA reach determination may prevent misdetermination due to some reasons such as a defect in a period when the pickup 51 is not expected to reach the BCA yet.

Note that the pickup 51 may not always stop near the center of the BCA due to an error and/or operational state even when the determination signal dBCA is not detected for the predetermined period of time Ta after the start of a BCA seek. However, a BCA read is allowed by optimizing the position of the objective lens in step F105 and subsequent steps even when the pickup 51 is stopped near an edge of the BCA.

Apparently, the predetermined period of time Ta may be defined in accordance with the distance from the address AD1 to the BCA and the velocity of the movement of the thread mechanism 53.

As described above, according to the second BCA seek operation example, a more highly reliable BCA seek operation may be achieved in addition to the advantage achieved by the first BCA seek operation example.

It should be understood by those skilled in the art that various modifications, combinations, sub-combinations and alterations may occur depending on design requirements and other factors insofar as they are within the scope of the appended claims or the equivalents thereof.

What is claimed is:

1. A disk drive apparatus for writing or reading in accordance with a disk recording medium having a Burst Cutting Area at a predetermined position, the apparatus comprising:
    pickup means for irradiating laser light to the disk recording medium for the writing or reading and for detecting reflected light from the disk recording medium;
    transporting means for transporting the pickup means in a direction of a radius of the disk recording medium;
    determining means for inputting a pull-in signal as a sum signal low component of the reflected light detected by the pickup means and for generating a determination signal indicating whether the pickup means is in the Burst Cutting Area or not by using an absolute value of a difference in a direction of a time axis of the pull-in signal; and
    seek control means for starting the transportation of the pickup means to the Burst Cutting Area by using the transporting means, for monitoring the determination signal during the transportation, and for finishing the transportation of the pickup means by the transporting means based on the determination signal.

2. The disk drive apparatus according to claim 1, wherein the seek control means, after finishing the transportation of the pickup means by the transporting means, shifts a position of an objective lens serving as a laser output end of the pickup means to multiple positions and, at the same time, monitors the determination signal, and controls the objective lens to an optimum position based on the determination signal at each of the objective lens positions.

3. The disk drive apparatus according to claim 1, wherein the determining means generates the determination signal by obtaining a stroke mean value with respect to the absolute value of the difference in the direction of the time axis of the pull-in signal and comparing the stroke mean value with a threshold value.

4. A disk drive apparatus for writing or reading in accordance with a disk recording medium having a Burst Cutting Area at a predetermined position, the apparatus including:
    a pickup unit configured to irradiate laser light to the disk recording medium for the writing or reading and to detect reflected light from the disk recording medium;
    a transporting unit configured to transport the pickup unit in a direction of a radius of the disk recording medium;
    a determining unit configured to input a pull-in signal as a sum signal low component of the reflected light detected by the pickup unit and to generate a determination signal indicating whether the pickup unit is in the Burst Cutting Area or not by using an absolute value of a difference in a direction of a time axis of the pull-in signal; and
    a seek control unit configured to start the transportation of the pickup unit to the Burst Cutting Area by using the transporting unit, to monitor the determination signal during the transportation, and to finish the transportation of the pickup unit by the transporting unit based on the determination signal.

5. A disk drive apparatus for writing or reading in accordance with a disk recording medium having a Burst Cutting Area at a predetermined position, the apparatus comprising:
    pickup means for irradiating laser light to the disk recording medium and for detecting reflected light from the disk recording medium;
    transporting means for transporting the pickup means in a direction of a radius of the disk recording medium;

determining means for inputting a signal obtained from the reflected light detected by the pickup means and for generating a determination signal indicating whether the pickup means is in the Burst Cutting Area or not by using the signal, the determining means generating the determination signal only after the pickup means is transported by the transporting means to an address in a management information area of the disk recording medium; and seek control means for starting the transportation of the pickup means to the Burst Cutting Area by using the transporting means for monitoring the determination signal after a lapse of a predetermined time after a start of the transportation, and for finishing the transportation of the pickup means by the transporting means based on the determination signal.

6. The disk drive apparatus according to claim 5, wherein the seek control means, after finishing the transportation of the pickup means to the Burst Cutting Area by the transporting means, shifts a position of an objective lens serving as a laser output end of the pickup means to multiple positions and, at the same time, monitors the determination signal, and controls the objective lens to an optimum position based on the determination signal at each of the positions.

7. The disk drive apparatus according to claim 5, wherein the determination signal is based on an absolute value of a difference value of a pull-in signal and a pull-in signal one clock before.

8. A disk drive apparatus for writing or reading in accordance with a disk recording medium having a Burst Cutting Area at a predetermined position, the apparatus comprising:
pickup means for irradiating laser light to the disk recording medium for writing or reading and for detecting reflected light from the disk recording medium;
transporting means for transporting the pickup means in a direction of a radius of the disk recording medium;
determining means for inputting a signal obtained from the reflected light detected by the pickup means and for generating a determination signal indicating whether the pickup means is in the Burst Cutting Area or not by using the signal, the determining means generating the determination signal by inputting a pull-in signal as a sum signal low component of the reflected light detected by the pickup means and using the absolute value of a difference in a direction of a time axis of the pull-in signal; and
seek control means for starting the transportation of the pickup means to the Burst Cutting Area by using the transporting means, for monitoring the determination signal after a lapse of a predetermined time after a start of the transportation, and for finishing the transportation of the pickup means by the transporting means based on the determination signal.

9. A disk drive apparatus for writing or reading in accordance with a disk recording medium having a Burst Cutting Area at a predetermined position, the apparatus comprising:
pickup means for irradiating laser light to the disk recording medium for writing or reading and for detecting reflected light from the disk recording medium;
transporting means for transporting the pickup means in a direction of a radius of the disk recording medium;
determining means for inputting a signal obtained from the reflected light detected by the pickup means and for generating a determination signal indicating whether the pickup means is in the Burst Cutting Area or not by using the signal, the determining means generating the determination signal by obtaining a stroke mean value with respect to the absolute value of a difference in a direction of a time axis of a pull-in signal and comparing the stroke mean value with a threshold value; and
seek control means for starting the transportation of the pickup means to the Burst Cutting Area by using the transporting means, for monitoring the determination signal after a lapse of a predetermined time after a start of the transportation, and for finishing the transportation of the pickup means by the transporting means based on the determination signal.

10. A disk drive apparatus for writing or reading in accordance with a disk recording medium having a Burst Cutting Area at a predetermined position, the apparatus comprising:
a pickup unit configured to irradiate laser light to the disk recording medium and to detect reflected light from the disk recording medium;
a transporting unit configured to transport the pickup unit in a direction of a radius of the disk recording medium;
a determining unit configured to input a signal obtained from the reflected light detected by the pickup unit and to generate a determination signal indicating whether the pickup unit is in the Burst Cutting Area or not by using the signal, the determining unit generating the determination signal only after the pickup unit is transported by the transporting unit to an address in a management information area of the disk recording medium; and
a seek control unit configured to start the transportation of the pickup unit to the Burst Cutting Area by using the transporting unit, to monitor the determination signal after a lapse of a predetermined time after a start of the transportation, and to finish the transportation of the pickup unit by the transporting unit based on the determination signal.

11. A seek method for a Burst Cutting Area in a disk drive apparatus for writing or reading in accordance with a disk recording medium having the Burst Cutting Area at a predetermined position, the method comprising:
starting transportation, to the Burst Cutting Area, of pickup means for irradiating laser light to the disk recording medium for the writing or reading and for detecting reflected light from the disk recording medium, with transporting means for transporting the pickup means;
determining, with a processor, whether the pickup means is in the Burst Cutting Area or not by using an absolute value of a difference in a direction of a time axis of a pull-in signal as a sum signal low component of the reflected light detected by the pickup means; and
finishing the transportation of the pickup means by the transporting means in accordance with the determining step detecting that the pickup means has reached the Burst Cutting Area.

12. The seek method according to claim 11, further comprising:
after finishing the transportation of the pickup means by the transporting means in the finishing step, shifting a position of an objective lens serving as a laser output end of the pickup means to multiple positions and, at the same time, monitoring determination results of the determining step, and controlling the objective lens to an optimum position based on a determination result at each of the objective lens positions.

13. A seek method for a Burst Cutting Area in a disk drive apparatus for writing or reading in accordance with a disk recording medium having the Burst Cutting Area at a predetermined position, the method comprising:
starting transportation, to the Burst Cutting Area, of pickup means for irradiating laser light to the disk recording medium and for detecting reflected light from the disk recording medium, with transporting means for transporting the pickup means;

determining, with a processor, whether the pickup means is in the Burst Cutting Area or not by using a signal obtained from the reflected light detected by the pickup means, only after the pickup means is transported to an address in a management information area of the disk recording medium;

standing by, with the processor, until a detection of a determination result of the determining step, for a predetermined period of time after the starting step starts the transportation; and finishing the transportation of the pickup means by the transporting means in accordance with the determining step detecting that the pickup means has reached a position of the Burst Cutting Area after a lapse of the predetermined period of time in the standing by step.

14. A disk drive apparatus, comprising:

an optical pickup configured to irradiate laser light to a disk recording medium and to detect reflected light from the disk recording medium;

a transporting unit configured to transport the optical pickup in a direction of a radius of the disk recording medium; and a processor configured to input a signal obtained from the reflected light detected by the optical pickup and to generate a determination signal indicating whether the optical pickup is in a Burst Cutting Area of the disk recording medium by using the signal, the processor further configured to generate the determination signal by inputting a pull-in signal as a sum signal low component of the reflected light detected by the optical pickup and using the absolute value of a difference in a direction of a time axis of the pull-in signal, the processor further configured to start transportation of the optical pickup to the Burst Cutting Area by using the transporting unit, to monitor the determination signal after a lapse of a predetermined time after a start of the transportation, and to finish the transportation of the optical pickup by the transporting unit based on the determination signal.

15. A disk drive apparatus, comprising:

an optical pickup configured to irradiate laser light to a disk recording medium and to detect reflected light from the disk recording medium;

a transporting unit configured to transport the optical pickup in a direction of a radius of the disk recording medium; and a processor configured to input a signal obtained from the reflected light detected by the optical pickup and to generate a determination signal indicating whether the optical pickup is in a Burst Cutting Area of the disk recording medium by using the signal, the processor further configured to generate the determination signal by obtaining a stroke mean value with respect to an absolute value of a difference in a direction of a time axis of a pull-in signal and comparing the stroke mean value with a threshold value, the processor further configured to start transportation of the optical pickup to the Burst Cutting Area by using the transporting unit, to monitor the determination signal after a lapse of a predetermined time after a start of the transportation, and to finish the transportation of the optical pickup by the transporting unit based on the determination signal.

16. A computer-readable medium including computer-executable instructions, wherein the instructions, when executed by a processor, cause the processor to perform a method comprising:

starting transportation, with a transporting unit, of an optical pickup to a Burst Cutting Area of a disk recording medium, the optical pickup configured to irradiate laser light to the disk recording medium and to detect reflected light from the disk recording medium, the transporting unit configured to transport the optical pickup;

determining, with a processor, whether the optical pickup is in the Burst Cutting Area by using an absolute value of a difference in a direction of a time axis of a pull-in signal as a sum signal low component of the reflected light detected by the optical pickup; and finishing the transportation of the optical pickup by the transporting unit in accordance with the determining step determining that the optical pickup is in the Burst Cutting Area.

17. A computer-readable medium including computer-executable instructions, wherein the instructions, when executed by a processor, cause the processor to perform a method comprising:

starting transportation, with a transporting unit, of an optical pickup to a Burst Cutting Area of a disk recording medium, the optical pickup configured to irradiate laser light to the disk recording medium and to detect reflected light from the disk recording medium, the transporting unit configured to transport the optical pickup;

determining, with a processor, whether the optical pickup is in the Burst Cutting Area by using a signal obtained from the reflected light detected by the optical pickup, only after the optical pickup is transported to an address in a management information area of the disk recording medium;

standing by, with the processor, until a detection of a determination result of the determining step, for a predetermined period of time after the starting step starts the transportation; and finishing the transportation of the optical pickup by the transporting unit in accordance with the determining step determining that the optical pickup is in the Burst Cutting Area after a lapse of the predetermined period of time in the standing by step.

* * * * *